US012062971B2

(12) United States Patent
Kiyooka et al.

(10) Patent No.: US 12,062,971 B2
(45) Date of Patent: Aug. 13, 2024

(54) MOVING BODY DRIVING UNIT

(71) Applicant: KANZAKI KOKYUKOKI MFG. CO., LTD., Hyogo (JP)

(72) Inventors: Koji Kiyooka, Hyogo (JP); Takashi Nishizawa, Hyogo (JP); Kousaku Kita, Hyogo (JP); Tasuku Inoue, Hyogo (JP); Tatsuya Kamada, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 733 days.

(21) Appl. No.: 16/748,036

(22) Filed: Jan. 21, 2020

(65) Prior Publication Data
US 2020/0244143 A1    Jul. 30, 2020

(30) Foreign Application Priority Data

Jan. 28, 2019  (JP) ................................. 2019-012305
Jan. 28, 2019  (JP) ................................. 2019-012312

(51) Int. Cl.
*H02K 9/19*     (2006.01)
*F16H 57/04*    (2010.01)
(Continued)

(52) U.S. Cl.
CPC ........... *H02K 9/19* (2013.01); *F16H 57/0483* (2013.01); *H02K 5/203* (2021.01); *H02K 7/116* (2013.01)

(58) Field of Classification Search
None
See application file for complete search history.

(56) References Cited

U.S. PATENT DOCUMENTS

| 8,936,120 B2 | 1/2015 | Takagi |
| 2008/0035399 A1 | 2/2008 | Murata et al. |

(Continued)

FOREIGN PATENT DOCUMENTS

| JP | 5044919 U | 5/1975 |
| JP | 2018207700 U | 5/1975 |

(Continued)

OTHER PUBLICATIONS

Machine translation of JP 2013-126280 A (Year: 2013).*

(Continued)

*Primary Examiner* — Daniel C Puentes
*Assistant Examiner* — Minki Chang
(74) *Attorney, Agent, or Firm* — CANTOR COLBURN LLP

(57) ABSTRACT

A moving body driving unit includes: a casing; an electric motor placed in a motor storage portion formed in an inner side of the casing on one side in a first direction which is predetermined and that has a motor shaft which extends in the first direction; a gear device placed in a gear storage portion formed in the inner side of the casing on the other side in the first direction and which also functions as an oil reservoir; a motive power transmitting mechanism placed at the inner side of the casing and that transmits motive power between the motor shaft and the gear device; an oil passage that interconnects the motor storage portion and the gear storage portion at the inner side of the casing; an oil introduction port; an oil discharge port; and an external oil path.

16 Claims, 14 Drawing Sheets

(51) Int. Cl.
*H02K 5/20* (2006.01)
*H02K 7/116* (2006.01)

(56) References Cited

U.S. PATENT DOCUMENTS

| | | | |
|---|---|---|---|
| 2008/0061645 A1 | 3/2008 | Yukitake | |
| 2013/0168174 A1 | 7/2013 | Takagi | |
| 2015/0027273 A1* | 1/2015 | Iwase | H02K 9/19 |
| | | | 74/665 B |
| 2019/0157923 A1* | 5/2019 | Morgante | H02K 3/24 |
| 2019/0173352 A1* | 6/2019 | Yamaguchi | H02K 9/19 |
| 2019/0234405 A1* | 8/2019 | Homma | F04C 2/102 |
| 2020/0052534 A1* | 2/2020 | Nakane | H02K 1/27 |
| 2021/0044173 A1* | 2/2021 | Ishikawa | H02K 7/116 |
| 2021/0167667 A1* | 6/2021 | Ishikawa | H02K 5/203 |

FOREIGN PATENT DOCUMENTS

| | | | |
|---|---|---|---|
| JP | 2008048494 A | | 2/2008 |
| JP | 2008067571 A | | 3/2008 |
| JP | 2008213775 A | | 9/2008 |
| JP | 2012044760 A | | 3/2012 |
| JP | 2013126280 A | * | 6/2013 |
| JP | 2016111723 A | | 6/2016 |

OTHER PUBLICATIONS

JPO Notice of Reasons of Refusal for corresponding JP Application No. 2019-012312; Mailing Date Aug. 30, 2022.
JPO Notice Reasons for Refusal for corresponding JP Application No. 2019-012305; Mailing Date, Oct. 4, 2022.

* cited by examiner

MOVING BODY DRIVING UNIT

CROSS REFERENCE TO RELATED APPLICATION

The present application claims priority under 35 U.S.C. § 119 to Japanese Patent Application No. 2019-12305 and Japanese Patent Application No. 2019-12312, both filed on Jan. 28, 2019, the entire contents of which being incorporated herein by reference.

TECHNICAL FIELD

The present disclosure relates to a moving body driving unit used for driving a wheel of a moving body.

BACKGROUND

In the related art, as described in U.S. Pat. No. 8,936,120, a structure is known in which an electric motor is placed on a front side of an electricity-driven vehicle (moving body), motive power generated by the electric motor is transmitted to a differential gear at the front side and to two front wheels on the left and right through two axles on the left and right, and the front wheels are rotated. In this structure, the electric motor is cooled by a traveling airflow of the vehicle.

As a driving unit used for driving wheels of a moving body, a structure may be considered in which an electric motor and a gear device are placed in a casing, oil for lubricating the gear device is accumulated in the casing, and other oil that is different from the lubricating oil is circulated in the electric motor, to cool the electric motor. In this case, however, the structure may cause an increase in the size of the driving unit and an increase in a number of components of the driving unit. Alternatively, another structure may be considered in which a portion where the gear device is placed and a portion where the electric motor is placed, which are not connected to each other inside the casing, are connected at an outer side of the casing by a pipe, and common oil is supplied. In this case also, the structure may cause an increase in the size of the driving unit and an increase in the number of components of the driving unit.

An advantage of the present disclosure lies in lubricating the gear device in a gear storage portion using oil-cooling oil for the electric motor while suppressing the increase in the size and the increase in the number of components in a moving body driving unit.

SUMMARY

According to one aspect of the present disclosure, there is provided a moving body driving unit used for driving a wheel of a moving body, comprising: a casing; an electric motor that is placed in a motor storage portion formed at an inner side of the casing on one side in a first direction which is predetermined, and that has a motor shaft which extends in the first direction; a gear device that is placed in a gear storage portion which is formed at the inner side of the casing on the other side in the first direction and which also functions as an oil reservoir, and that cooperates with the wheel; a motive power transmitting mechanism that is placed at the inner side of the casing and that transmits motive power between the motor shaft and the gear device; an oil passage that interconnects the motor storage portion and the gear storage portion at the inner side of the casing; an oil introduction port that is formed at an upper side of the motor storage portion and through which oil is supplied to the electric motor for cooling the electric motor; an oil discharge portion that is formed at a lower side of the gear storage portion; and an external oil path that is connected to the oil introduction port and the oil discharge port at an outer side of the casing and that has an oil pump.

BRIEF DESCRIPTION OF DRAWINGS

Embodiment(s) of the present disclosure will be described based on the following figures, wherein.

DESCRIPTION OF EMBODIMENTS

Figure 1:
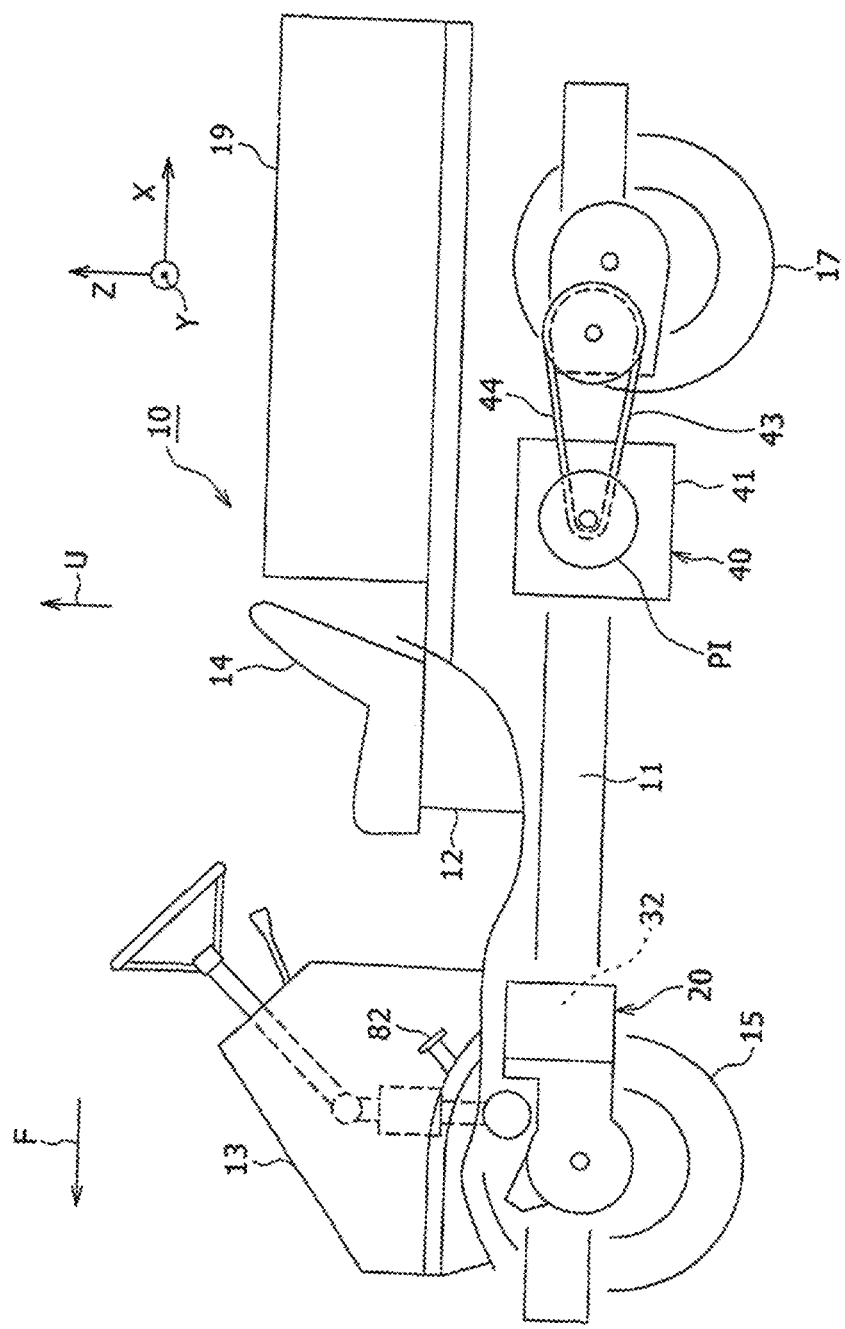
FIG. 1 is a side view of a moving body including a moving body driving unit according to an embodiment of the present disclosure.

An embodiment of the present disclosure will now be described in detail with reference to the drawings. In the following, a configuration will be described in which a moving body including a moving body driving unit is an off-road-type utility vehicle which has a cargo and which travels on rough terrain such as forests, swamps, wasteland, rocky mountains, or the like. Alternatively, the moving body may be a work vehicle which has a worker who performs one or more tasks including snow removal, excavating, public works, agricultural work, lawn-mowing work, or the like, an all-terrain vehicle (ATV) called a buggy, a recreational vehicle (RV), a recreational off-highway vehicle (ROV), or the like. In the following, members that are similar over the drawings are assigned the same reference numerals for the description.

Figure 2:
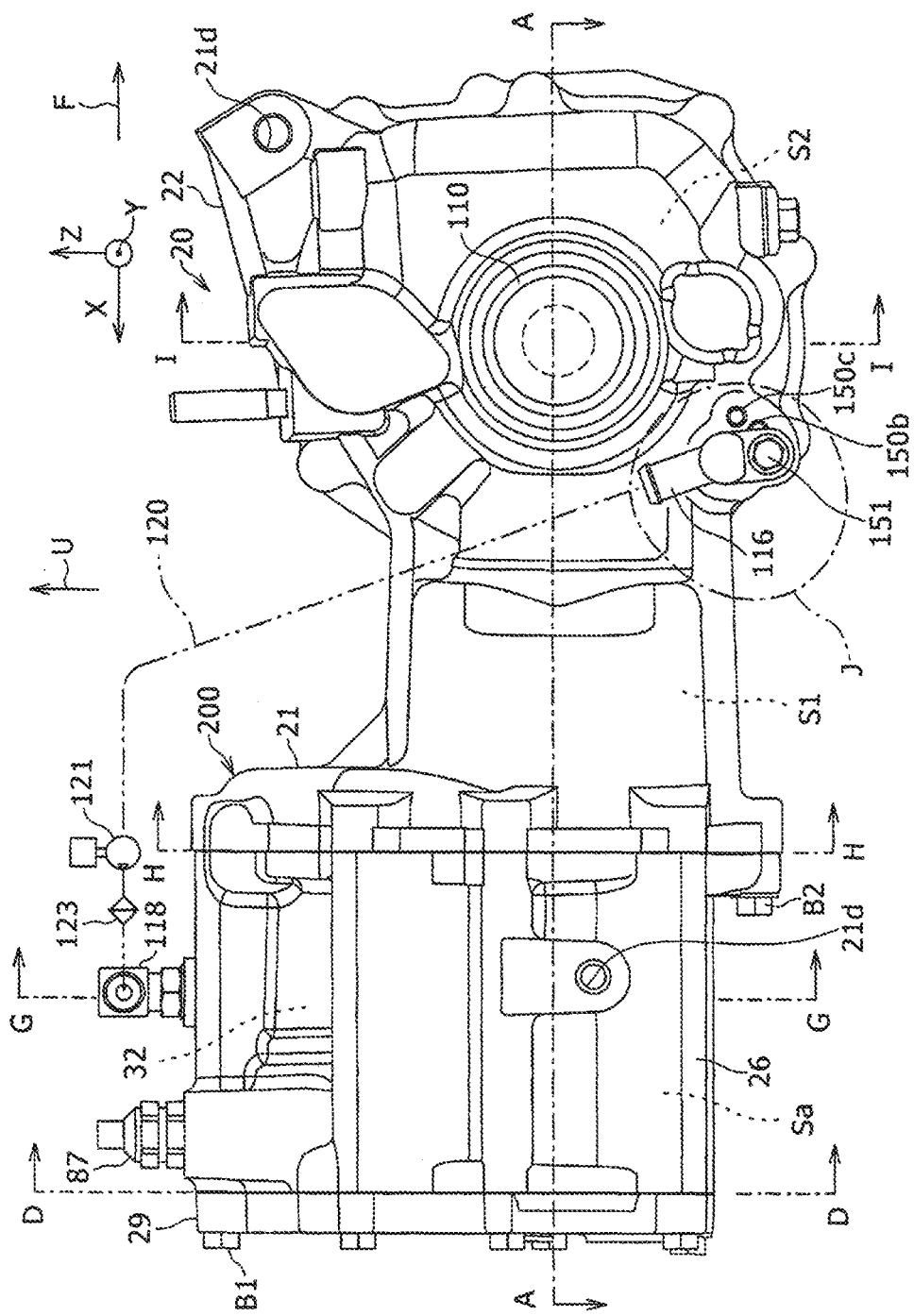
FIG. 2 is a diagram showing a moving body driving unit according to an embodiment of the present disclosure, viewed from one side in a left-and-right direction of a vehicle.

FIG. 1 to FIG. 12 shows an embodiment of the present disclosure. FIG. 1 is a side view of an electricity-driven vehicle 10 including a moving body driving unit according to the present embodiment. The electricity-driven vehicle 10 has an oil cooling structure for an electric motor. The electricity-driven vehicle 10 corresponds to a moving body. FIG. 2 is a diagram showing a moving body driving unit 20, viewed from one side in a left-and-right direction of the vehicle. In a part of the drawings described below, a front-and-rear direction is shown by X, the left-and-right direction is shown by Y, and an up-and-down direction is shown by Z. In addition, a front side is shown by F, a left side is shown by L, and an upper side is shown by U. The front-and-rear direction X corresponds to a first direction which is predetermined, the left-and-right direction Y corresponds to a second direction, and the up-and-down direction Z corresponds to a third direction. The directions X, Y, and Z are orthogonal to each other.

In the electricity-driven vehicle 10 shown in FIG. 1, a platform 12 which is a base structure is fixed at an upper side of a frame 11 forming a vehicle body, and a front cover 13 is fixed to the front side of the frame 11 (left side of FIG. 1). Hereinafter, the electricity-driven vehicle 10 will also be referred to simply as a vehicle 10. On the platform 12, a driver seat 14 is fixed at a rear side of the front cover 13, and a cargo 19 is fixed at a rear side of the driver seat 14. The vehicle 10 has wheels on both sides in the front-and-rear direction X which is a direction of travel. Specifically, the vehicle 10 has two front wheels 15 on the left and the right and two rear wheels 17 on the left and the right, which are wheels supported on both sides in the front-and-rear direction of the frame 11, and movable unit driving units 20 and 40 placed on the front and rear sides.

The moving body driving unit 20 at the front side is used for driving the two front wheels 15 at the left and the right using motive power of a motor (electric motor) 32 which is a motive power source. The moving body driving unit 40 at the rear side is used for driving the two rear wheels 17 at the left and the right using motive power of an engine 41 which is a motive power source.

When an acceleration pedal 82 of the vehicle 10 is step-in operated, an amount of operation thereof is detected by a pedal sensor (not shown), and a detection signal thereof is sent to a control apparatus (not shown). In response to the signal, the control apparatus outputs a control signal for driving the motor 32 included in the moving body driving unit 20 at the front side. The motor 32 is driven by a supply of electric power from a battery (not shown) which is a power supply. When an operator selects a four-wheel drive mode, the control apparatus cooperatively controls the motor 32 and the engine 41 for driving the moving body driving unit 40 at the rear side so that circumferential speeds of the front and rear wheel are synchronized.

Figure 3:
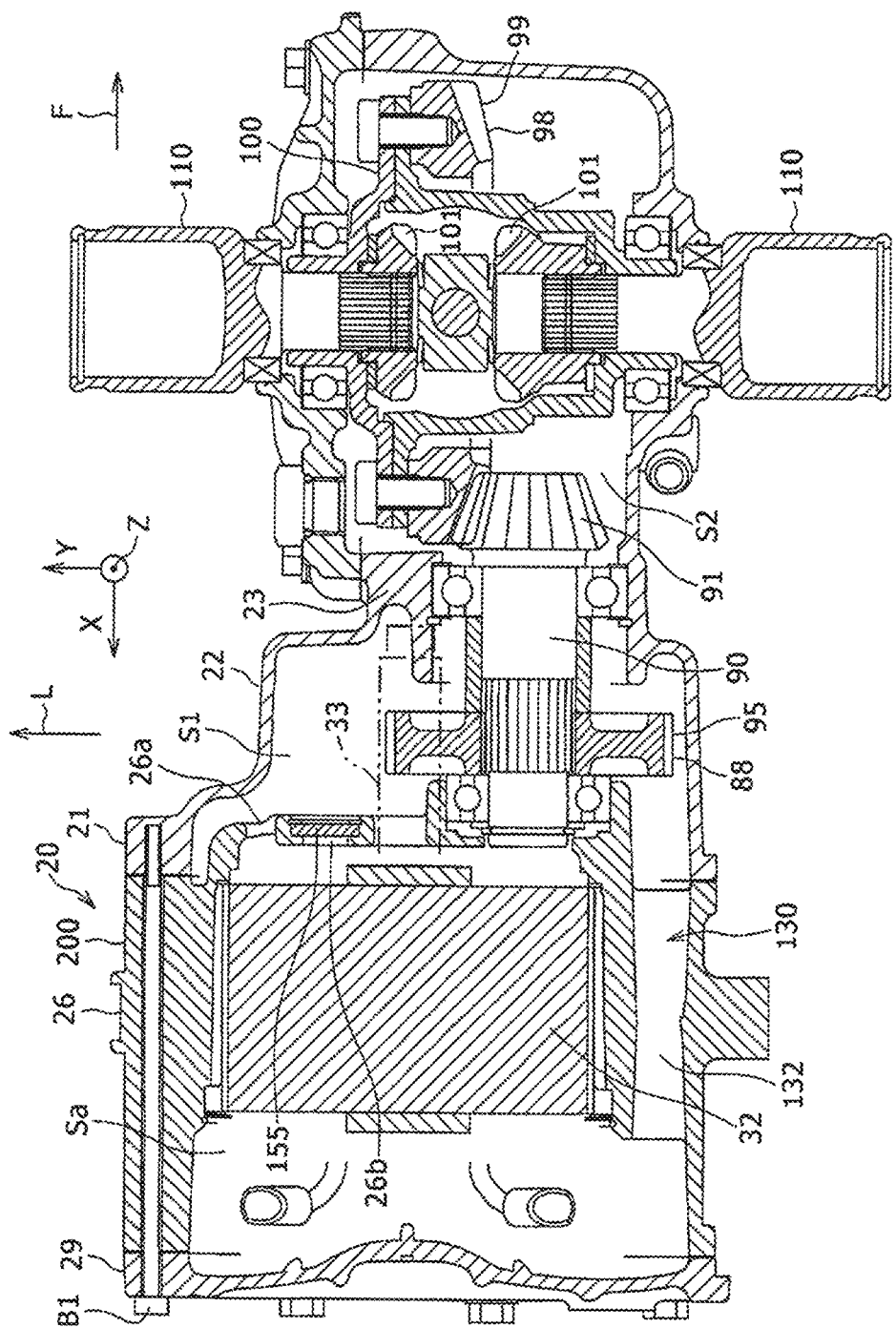
FIG. 3 is a cross-sectional diagram along a line A-A of FIG. 2.

FIG. 3 is a cross-sectional diagram along a line A-A of FIG. 2. The moving body driving unit 20 at the front side is formed including a motive power transmitting mechanism 88 and a differential gear device 98 at the front side. As will be described below, the motive power of the motor 32 is transmitted to the differential gear device 98 via the motive power transmitting mechanism 88. The differential gear device 98 outputs the motive power to the front wheels 15 which are wheels, from two output shafts 110 placed in a branched manner on both sides in the left-and-right direction Y at the front side of the vehicle 10 and extending in the left-and-right direction. With this configuration, the front wheel 15 which is connected to each of the two output shafts 110 via an axle (not shown) is driven. In this process, the differential gear device 98 cooperates with the front wheel 15.

The moving body driving unit 40 at the rear side is formed including the engine 41, a motive power transmitting portion 43, and two output shafts (not shown) placed in a branched manner on both sides in the left-and-right direction Y at the rear side of the vehicle 10 and extending in the left-and-right direction Y. The engine 41 is controlled by the control apparatus (not shown) such that a rotational velocity is increased with a step-in operation of the acceleration pedal 82. The motive power transmitting portion 43 includes a CVT 44 which is a belt-type continuously variable transmission device, a gear transmission device (not shown), and a differential gear device at the rear side (not shown). A gear reduction ratio of the CVT 44 is controlled by an actuator. In the CVT 44, the gear reduction ratio is reduced as the rotational velocity of the engine 41 is increased, by increasing a winding size of the belt at an input pulley PI. With this configuration, fuel consumption in a high-speed traveling of the vehicle 10 can be improved. The motive power of the engine 41 is transmitted to the two output shafts via the CVT 44, the gear transmission device, and the differential gear device at the rear side. With this process, the rear wheel 17 which is connected to each of the two output shafts via an axle (not shown) is driven.

Figure 4:
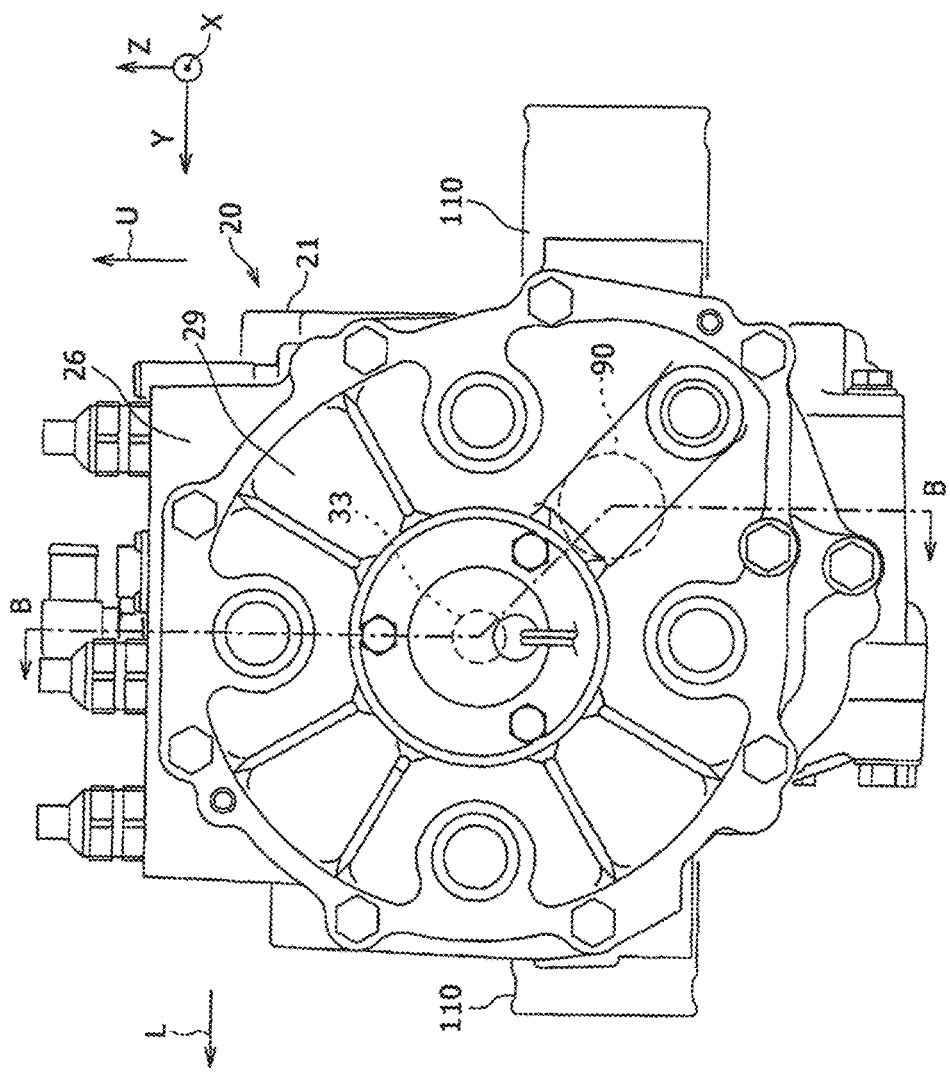
FIG. 4 is a diagram showing the moving body driving unit of FIG. 2, viewed from a rear side.
Figure 5:
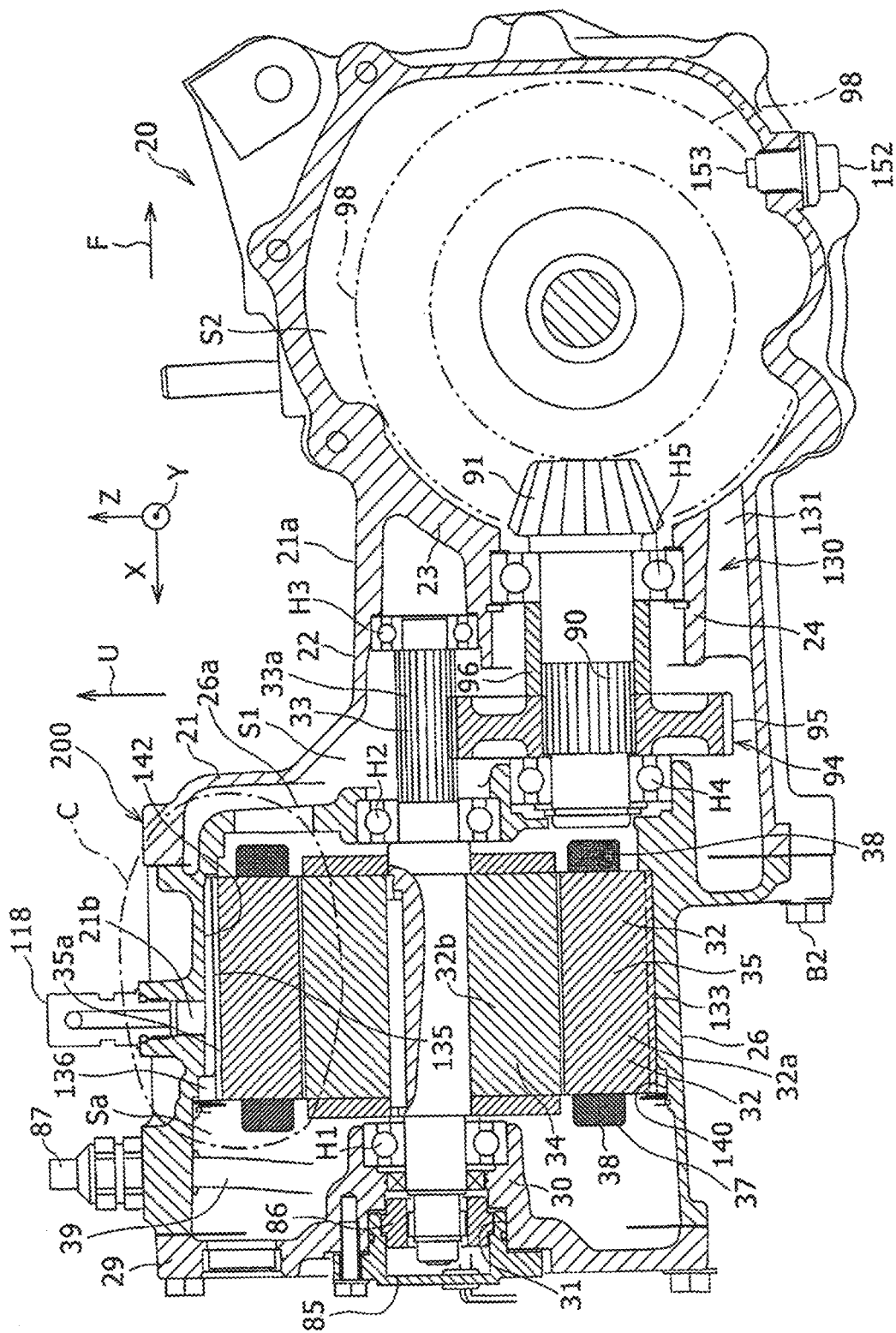
FIG. 5 is a cross-sectional diagram along a line B-B of FIG. 4.
Figure 6:
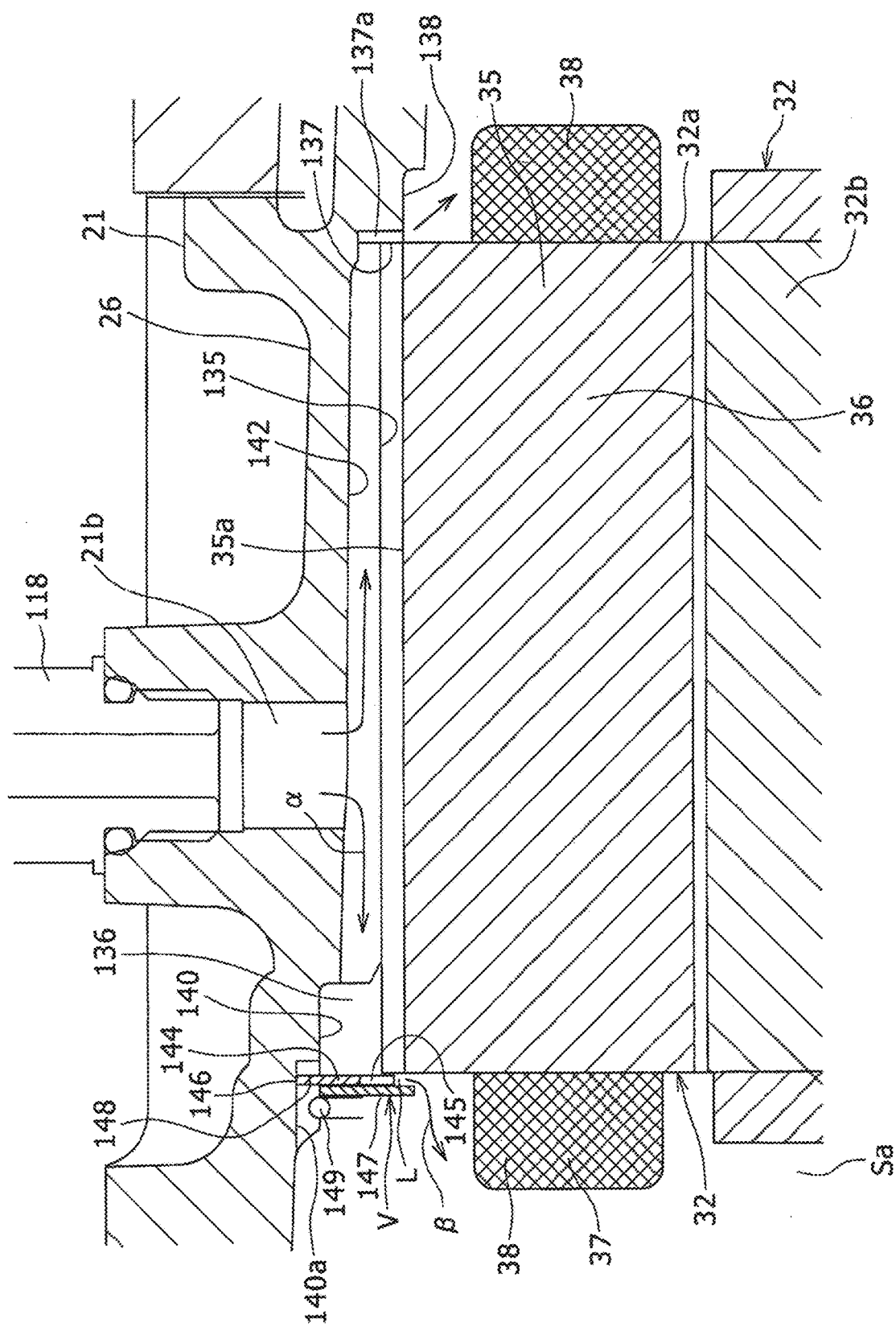
FIG. 6 is an enlarged view of a C part of FIG. 5.
Figure 7A:
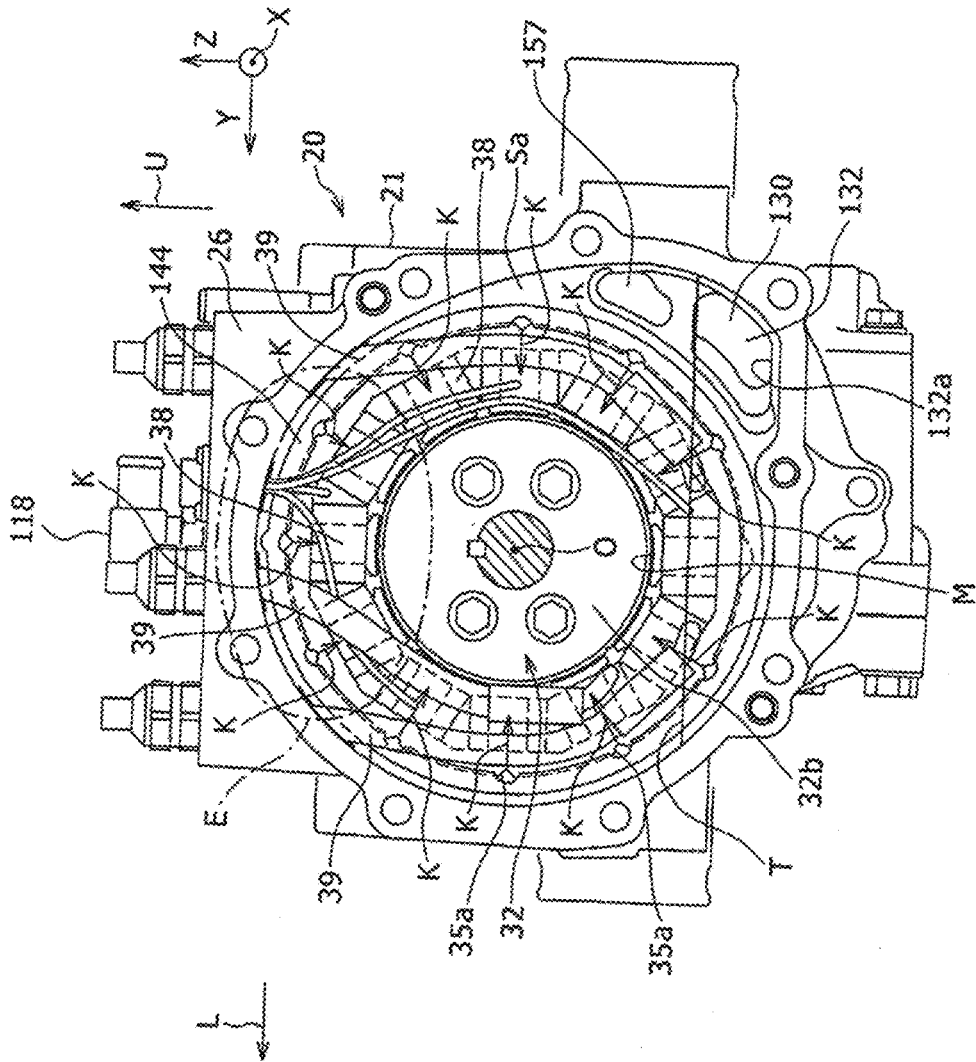
FIG. 7A is a cross-sectional diagram along a line D-D of FIG. 2.
Figure 7B:
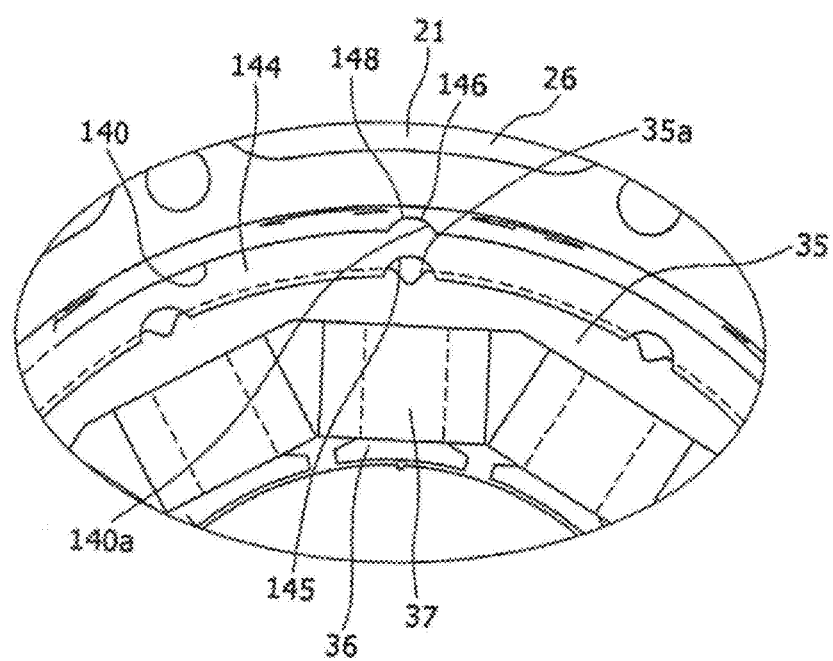
FIG. 7B is an enlarged view of an E part of FIG. 7A, with a portion omitted.
Figure 8:
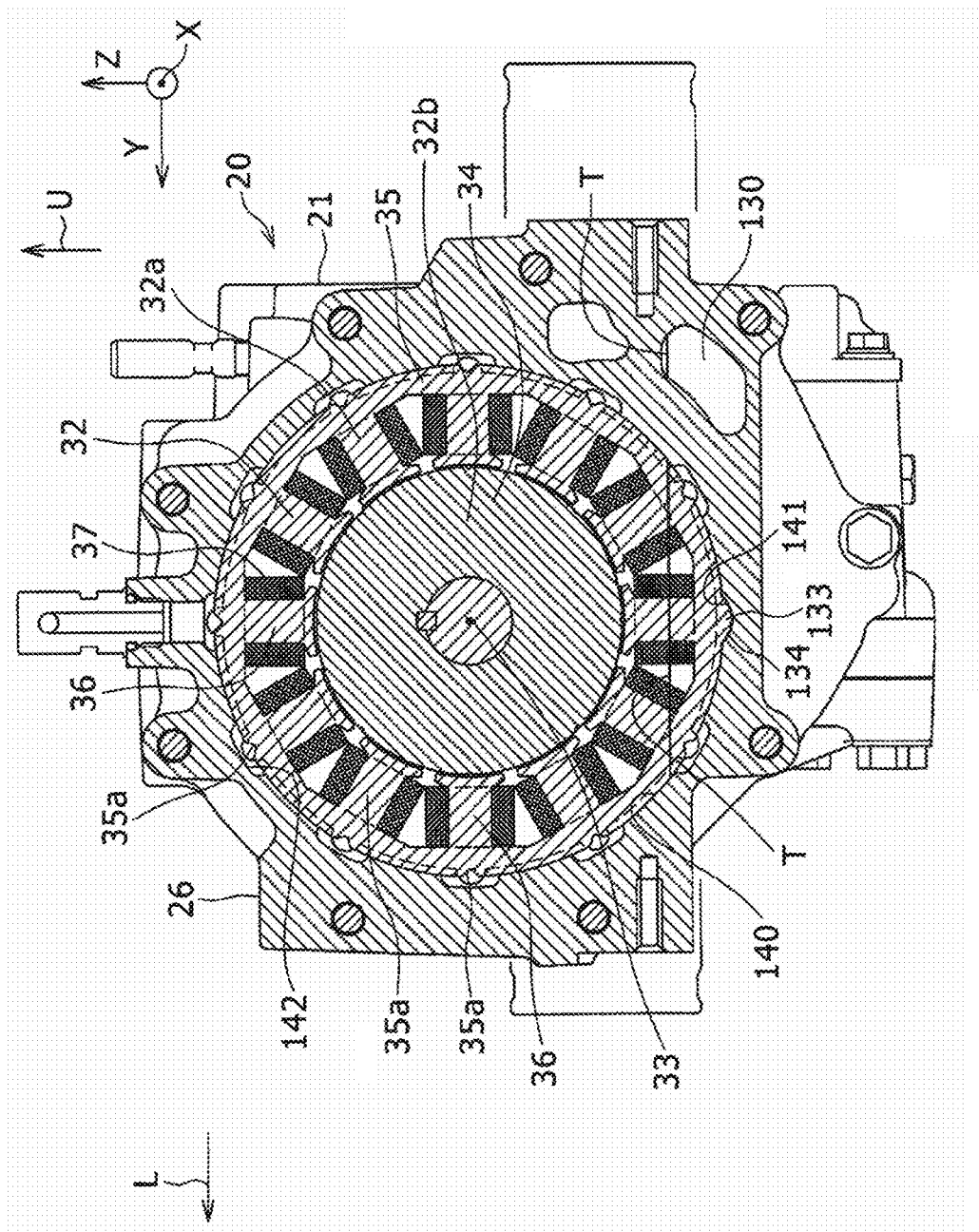
FIG. 8 is a cross-sectional diagram along a line G-G of FIG. 2.
Figure 9:
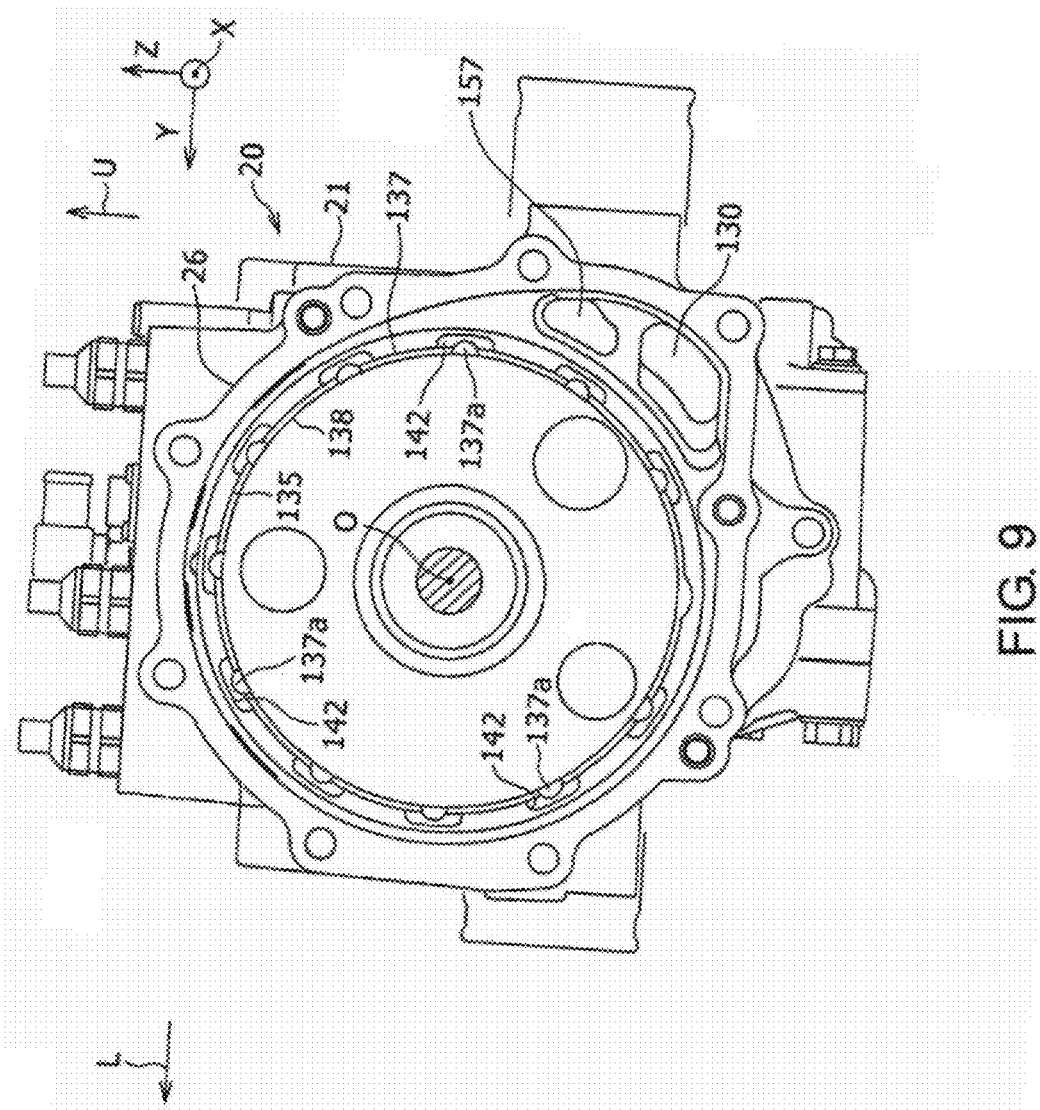
FIG. 9 is a diagram similar to FIG. 7A, with the motor and the cable omitted.
Figure 10:
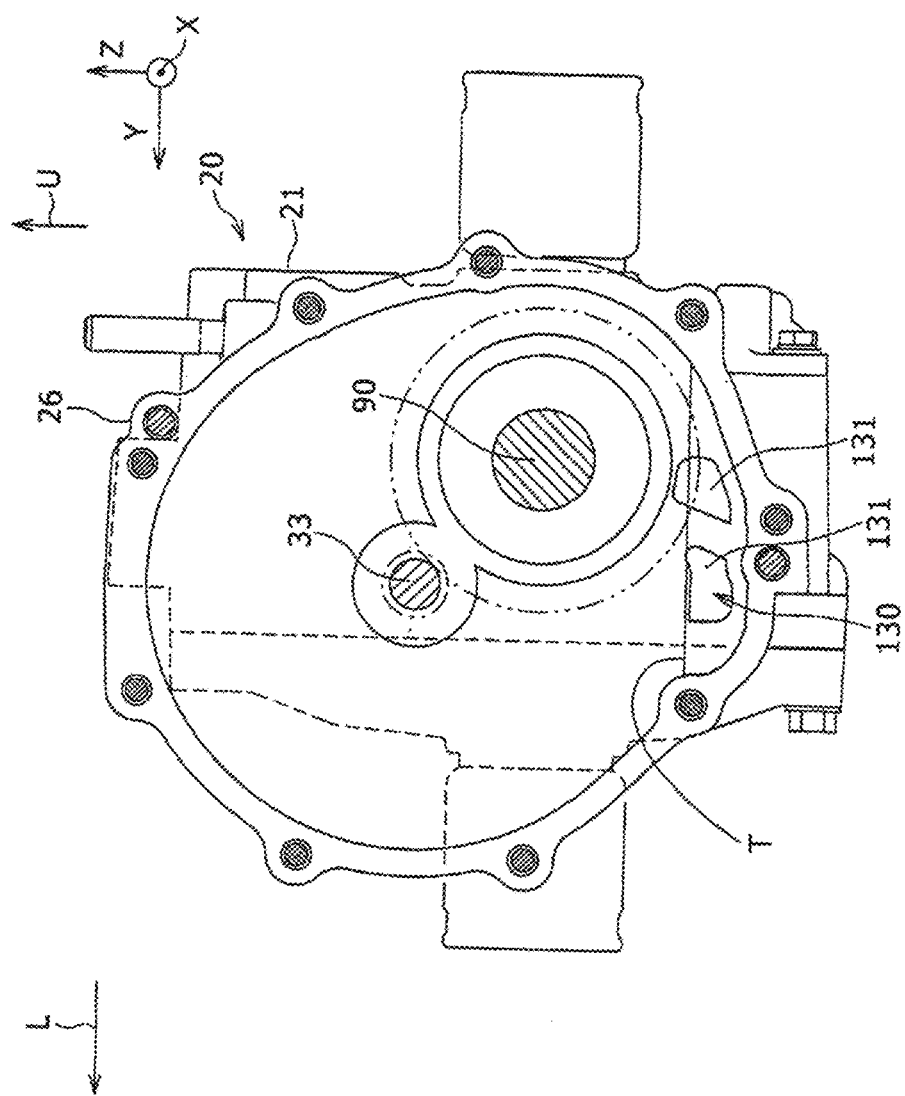
FIG. 10 is a cross-sectional diagram along a line H-H of FIG. 2, with a portion omitted.
Figure 11:
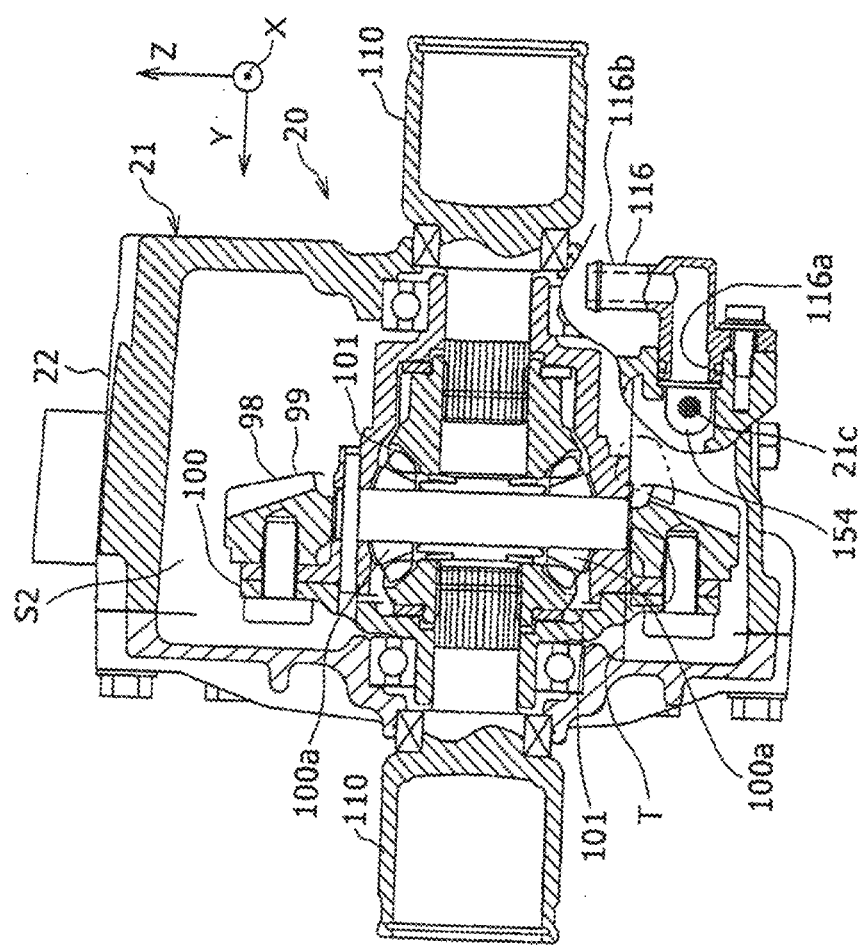
FIG. 11 is a cross-sectional diagram along a line I-I of FIG. 2.

Next, the moving body driving unit 20 at the front side will be described with reference to FIG. 2~FIG. 12. FIG. 4 is a diagram showing the moving body driving unit 20, viewed from the rear side. FIG. 5 is a cross-sectional diagram along a line B-B of FIG. 4. FIG. 6 is an enlarged view of a C part of FIG. 5. FIG. 7A is a cross-sectional diagram along a line D-D of FIG. 2. FIG. 7B is an enlarged view of an E part of FIG. 7A, with a part omitted. FIG. 8 is a cross-sectional diagram along a line G-G of FIG. 2. FIG. 9 is a diagram similar to FIG. 7A, with the motor 32 and a cable 39 omitted. FIG. 10 is a cross-sectional diagram along a line H-H of FIG. 2, with a part omitted. FIG. 11 is a cross-sectional diagram along a line I-I of FIG. 2.

The moving body driving unit 20 includes an oil cooling structure 200 of the motor. The oil cooling structure 200 of the motor is formed including a casing 21, the motor 32, and an oil introduction joint 118. The moving body driving unit 20 suppresses output loss in the oil cooling of the motor 32 by suppressing, when the motor 32 placed in the casing 21 is cooled by oil, contact, with a rotor, of the oil accumulated in a motor storage portion Sa in which the motor 32 is placed, while suppressing the increases in the size and the number of components. In the following, elements of the moving body driving unit 20 and the oil cooling structure 200 will be described in detail. The oil cooling structure 200 of the present embodiment also improves a cooling characteristic of the motor 32 by increasing a surface, of a motor 32 in the circumferential direction, with which the oil contacts, when the motor 32 placed in the casing 21 is oil-cooled by oil introduced from outside through the oil introduction joint 118.

The casing 21 in which the motor 32 and various transmission gears are placed is formed by combining and integrating a front-side casing element 22 placed at the front side F, a rear-side casing element 26 having a tubular shape with a bottom and placed at the rear side, and a cover 29, with a plurality of bolts B1. The front-side casing element 22 is abutted against a front end (right end of FIG. 3) of the rear-side casing element 26, and the cover 29 is abutted against a rear end (left end of FIG. 3) of the rear-side casing element 26. The front-side and rear-side casing elements 22 and 26, and the cover 29 are commonly fastened by a common bolt B1 which extends in the front-and-rear direction X, so that the number of components is reduced and the size is reduced. The front-side and rear-side casing elements 22 and 26 are also combined by a bolt B2. The cover 29 blocks a rear end opening of the rear-side casing element 26.

In this state, in the casing 21, the motor storage portion Sa, a first gear storage portion S1, and a second gear storage portion S2 are formed.

The motor storage portion Sa is formed by an inside space of the rear-side casing element 26 having the rear end blocked by the cover 29. The motor 32 is placed in the motor storage portion Sa. As shown in FIG. 3 and FIG. 5, the first gear storage portion S1 is formed more toward a rear side (left side of FIG. 3 and FIG. 5) than a partitioning portion 23 formed at an inner side of an intermediate portion of the front-side casing element 22 in the front-and-rear direction X. The second gear storage portion S2 is formed more toward a front side (right side of FIG. 3 and FIG. 5) than the partitioning portion 23 of the front-side casing element 22. With this configuration, the first gear storage portion S1 is placed between the motor storage portion Sa and the second gear storage portion S2. Therefore, the motor storage portion Sa is formed at the rear side of the inner side of the casing 21, and the second gear storage portion S2 is formed at the front side F of the inner side of the casing 21.

A front-side portion (right-side portion of FIG. 5) of a motor shaft 33, to be described later, and a gear shaft 90 are placed in the first gear storage portion S1. The differential gear device 98 to be described later is placed in the second gear storage portion S2. The first gear storage portion S1 corresponds to an intermediate gear storage portion. The gear shaft 90 forms the motive power transmitting mechanism 88 along with a gear mechanism 94 having a second gear portion 95. The second gear portion 95 corresponds to an intermediate gear. The motive power transmitting mechanism 88 is placed at the inner side of the casing 21, and transmits the motive power between the motor shaft 33 and the differential gear device 98. At a lower part of the inner side of the casing 21, a predetermined amount of oil for cooling and lubricating the motor 32 and various gears is accumulated, in consideration of a stirring resistance. A solid line T in a lateral direction shown in FIG. 7A, FIG. 8, FIG. 10, and FIG. 11 shows an oil surface (upper surface). Shapes of the three storage portions Sa, S1, and S2 are set such that the storage portions Sa, S1, and S2 are in communication with each other by an oil passage 130, and a height of a bottom is gradually lowered from the storage portion Sa toward the storage portion S2, in order to allow the oil to flow from the storage portion Sa toward the storage portion S2.

The oil passage 130 has the first gear storage portion S1 in which the second gear portion 95 is placed, a first pass-through portion 131, and a second pass-through portion 132. As shown in FIG. 3, the casing 21 includes a partitioning wall 26a which is a front end portion of the rear-side casing element 26, and which partitions the motor storage portion Sa and the first gear storage portion S1. As shown in FIG. 5 and FIG. 10, the first pass-through portion 131 is formed at a front end portion of the oil passage 130 at a lower side of the gear shaft 90 to be described later, extends in the front-and-rear direction X, and passes through the partitioning portion 23, so that the first gear storage portion S1 and the second gear storage portion S2 are in communication with each other. In FIG. 10, a plurality of the first pass-through portions 131 are provided, but alternatively, the number of the first pass-through portions 131 may be only one, or three or more. As shown in FIG. 3, and FIG. 7A FIG. 9, the second pass-through portion 132 is formed at a rear end portion of the oil passage 130, extends in the front-and-rear direction X, and passes through the partitioning wall 26a, so that the motor storage portion Sa and the first gear storage portion S1 are in communication with each other. The second pass-through portion 132 is formed at an outer side in a radial direction of the motor storage portion Sa in the rear-side casing element 26, and interconnects the motor storage portion Sa and the first and second gear storage portions S1 and S2. For this purpose, as shown in FIG. 7A, at the same motor axial direction position as a coil end 38 to be described later at an opposite side from the second gear storage portion S2 in the motor 32, the motor storage portion Sa has a shape protruding toward the side of the second pass-through portion 132, and the motor storage portion Sa is connected to a rear end (front side end of the page of FIG. 7A) of the second pass-through portion 132 at the protruding portion. Further, as shown in FIG. 7A and FIG. 8, a lower end 132a of the second pass-through portion 132 and an opening end to the motor storage portion Sa are respectively provided at a side that is lower down than a rotor 32b of the motor 32. More specifically, the lower end 132a of the second pass-through portion 132 is at a side that is lower down than a lowermost end M of the rotor 32b of the motor 32. The oil passage 130 is in communication with the first gear storage portion S1. The first gear storage portion S1 and the second gear storage portion S2 also have a function of an oil reservoir in which the oil is accumulated. With the oil passage 130 described above, it becomes easier to set the oil surface T of the oil accumulated in the motor storage portion Sa to be lower than the lower end of the rotor 32b, as will be described later. With this configuration, contact of the oil accumulated in the motor storage portion Sa with the rotor 32b can be suppressed, and consequently, the output loss in the oil cooling of the motor 32 can be suppressed. In FIG. 7A, FIG. 8, and FIG. 9, a third pass-through portion 157 is provided in parallel to the second pass-through portion 132 at the upper side of the second pass-through portion 132. Similar to the second pass-through portion 132, the third pass-through portion 157 connects the motor storage portion Sa and the first gear storage portion S1. Alternatively, the third pass-through portion 157 may be omitted.

On an upper surface of the casing 21, a recess 21a (FIG. 5) is formed at an intermediate portion in the front-and-rear direction X. As shown in FIG. 3~FIG. 5 and FIG. 10, the motor shaft 33 of the motor 32 and the gear shaft 90 are placed at positions that are different from each other in the left-and-right direction Y and the up-and-down direction Z. With this configuration, the sizes in the up-and-down direction Z and the left-and-right direction Y at the periphery of the motor shaft 33 and the gear shaft 90 in the casing 21 can be set small.

As shown in FIG. 2, the casing 21 may include bracket portions 21d for fixation via a fastening member such as a bolt, at a front side of the frame 11 and at the same positions in the front-and-rear direction on the left and right side surfaces.

As shown in FIG. 5~FIG. 8, the motor 32 is, for example, a three-phase motor of a permanent magnet type, having a stator 32a and the rotor 32b placed at an inner side in a radial direction of the stator 32a. The motor 32 is placed at the inner side of the rear-side casing element 26. The motor 32 has the motor shaft 33 which extends in the front-and-rear direction X, a rotor core 34 having a circular cylindrical shape and fixed at a periphery of the motor shaft 33, a stator core 35 having an approximate circular cylindrical shape, and a three-phase stator coil 37. The stator 32a is formed including the stator core 35 and the three-phase stator coil 37. The rotor 32b is formed including the rotor core 34, and permanent magnets (not shown) placed at a plurality of positions in a circumferential direction of the rotor core 34.

The permanent magnet is, for example, magnetized in the radial direction of the rotor. The rotor core 34 and the stator core 35 are formed by a magnetic material such as iron, silicon steel, or the like. The stator core 35 is fitted and fixed at the inner side of the rear-side casing element 26. In this configuration, as shown in FIG. 8, a recess-projection engagement portion 133 for blocking rotation of the stator core 35 with respect to the casing 21 is provided between an inner side surface of the rear-side casing element 26 and an outer circumferential surface of the stator core 35. The recess-projection engagement portion 133 corresponds to a core-side recess-projection engagement portion. The recess-projection engagement portion 133 is formed from a protrusion 134 positioned at a lower side than the oil surface and formed to protrude toward an outer side in the radial direction to a lower end portion which is a part, in the circumferential direction, of the outer circumferential surface of the stator core 35, and a recess 141 formed at a part, in the circumferential direction, of a large-diameter tubular portion 140, to be described later, of the inner side surface of the rear-side casing element 26. The protrusion 134 is locked with the recess 141. With this configuration, the rotation of the stator core 35 with respect to the casing 21 is blocked. Because of this, it becomes possible to easily match the positions, with respect to the motor circumferential direction, of a stator oil groove 35a, to be described later, formed on the outer circumferential surface of the stator core 35 and a casing oil groove 142, to be described later, formed on the casing 21, at the time of manufacture of the moving body driving unit 20. In addition, the recess 141 is provided at the bottom-most portion in a front view of the large-diameter tubular portion 140. This position is always under the oil surface in a motor driving state, and the coil end 38 placed therein is always immersed in the oil. Thus, supplying of the oil for cooling is not necessary, and consequently, the recess-projection engagement portion 133 is provided in place of forming the stator oil groove 35a and the casing oil groove 142. Therefore, the protrusion 134 can be set to a size having a strength necessary for blocking the rotation.

At a plurality of positions on an inner circumferential surface of the stator core 35, a plurality of teeth 36 which protrude in an inner circumferential side are formed. The stator coil 37 of three phases are wound around the plurality of teeth 36 by a concentrated winding. In this manner, the stator coil 37 is wound around the stator core 35 at the inner circumferential side at a plurality of positions in the circumferential direction. Alternatively, the three-phase stator coil 37 may be wound around the plurality of teeth 36 by a distributed winding. As shown in FIG. 6, at respective ends of the stator coil 37 in the axial direction of the stator 32a, a plurality of coil ends 38 on respective sides in the axial direction of the stator are formed by portions of the stator core 35 protruding toward an outer side from end surfaces in the axial direction.

Ends in the front-and-rear direction X of the motor shaft 33 protrude from side surfaces in the front-and-rear direction X of the rotor core 34. A rear end portion of the motor shaft 33 passes through an inner side of a tubular portion 30 formed at a center part of the cover 29 in a manner to protrude toward the side of the motor storage portion Sa, and is rotatably supported with respect to the casing 21 by a bearing H1 which is fixed at the inner side of the tubular portion 30. On the cover 29, a cap 85 is fixed at an opening periphery of a hole 32 which is in communication with the inner side of the tubular portion 30 of a rear side surface (left side surface of FIG. 5). The cap 85 has a tubular shape with a bottom, and has a flange. With the cap 85, the inner side of the hole 31 is tightly sealed from an outer side of the casing 21.

Further, a rotational velocity detector 86 is placed between an outer circumferential surface of the rear end portion (left end portion of FIG. 5) of the motor shaft 33 and the cap 85. The rotational velocity detector 86 detects a rotational velocity of the motor shaft 33. Alternatively, in place of the rotational velocity detector 86, an angle detector which detects a rotational angle of the motor shaft 33 may be placed. A detection signal of the rotational velocity detector 86 or the angle detector is sent to the control apparatus via a cable. When the detection signal of the angle detector is sent to the control apparatus, the control apparatus calculates the rotational velocity of the motor shaft 33 based on the received detection signal. The rotational velocity detector and the angle detector are formed, for example, including a resolver.

A front-side portion (right-side portion of FIG. 5) of the motor shaft 33 passes through a hole formed on the partitioning wall 26a of the rear-side casing element 26 and is placed in the first gear storage portion S1. The front-side portion of the motor shaft 33 is rotatably supported with respect to the casing 21 by a bearing H2 fixed to the hole of the partitioning wall 26a and a bearing H3 fixed at the inner side of the front-side casing element 22. At the front-side portion of the motor shaft 33, a first gear portion 33a is directly formed between the two bearings H2 and H3. The first gear portion 33a is, for example, a helical gear which is superior in quietness. The second gear portion 95 fixed to the gear shaft 90, to be described later, engages the first gear portion 33a.

The cable 39 which extends from the three-phase stator coil 37 is connected to three connectors 87 fixed in a manner to protrude on an upper end portion of the rear-side casing element 26. Electric power from the battery is output to an inverter (not shown), and three-phase electric wires (not shown) connected to the inverter are connected to the three connectors 87. The battery is placed, for example, at a lower side of the driver seat 14 or the cargo 19 of the vehicle. The inverter converts direct current electric power into three-phase alternating current electric power. At the time of driving of the motor 32, the inverter is controlled by the control apparatus, and the three-phase alternating current electric power is output to the three-phase stator coil 37 via the three connectors 87. With this process, a rotational magnetic field is generated in the stator core 35, and the rotor core 34 and the motor shaft 33 are rotated by the rotational magnetic field. Alternatively, the electric motor may be a motor other than the three-phase permanent magnet type motor, such as a DC motor, an induction motor, or the like.

The gear shaft 90 extends in the front-and-rear direction X, and a bevel gear 91 is formed at a front end portion (right end portion of FIG. 5) of the gear shaft 90. The bevel gear 91 is, for example, a spiral bevel gear. The gear shaft 90 is placed at an inner side of the rear-side portion (left-side portion of FIG. 5) of the front-side casing element 22, in parallel with the front-side portion of the motor shaft 33.

A rear end portion (left end portion of FIG. 5) of the gear shaft 90 is rotatably supported with respect to the casing 21 by a bearing H4 fixed in a hole formed in the partitioning wall 26a of the rear-side casing element 26. A front end portion (right end portion of FIG. 5) of the gear shaft 90 is rotatably fixed with respect to the casing 21 by a bearing H5 fixed at the inner side of a tubular portion 24 formed on the partitioning portion 23 of the front-side casing element 22.

An inner circumferential surface of the second gear portion 95 is fixed on an outer circumferential surface of the gear shaft 90 between two bearings H4 and H5 in a state where relative rotation is blocked. The second gear portion 95 is sandwiched in the front-and-rear direction X by two bearings H4 and H5 via a circular cylindrical collar 96. The second gear portion 95 engages the first gear portion 33a formed on the motor shaft 33. The gear mechanism 94 is formed including the first gear portion 33a and the second gear portion 95. With this configuration, the gear mechanism 94 transmits the motive power from the motor shaft 33 to the gear shaft 90.

As shown in FIG. 3 and FIG. 11, the differential gear device 98 is placed in the second gear storage portion S2 of the front-side casing element 22. The differential gear device 98 includes a ring gear 99 which engages the bevel gear 91 of the gear shaft 90, a differential gear casing 100 on which the ring gear 99 is fixed, a pinion gear 100a (FIG. 11) rotatably supported on the differential gear casing 100, and two side gears 101 at left and right sides, which are placed in the differential gear casing 100 and which engage the pinion gear 100a. The two side gears 101 are respectively fixed on one end of each of the two output shafts 110 at the left and the right.

The two output shafts 110 are placed in a branched manner to respective sides in the left-and-right direction Y, and extend in the left-and-right direction Y. The other end side portions of the two output shafts 110 protrude from respective side ends of the casing 21 in the left-and-right direction Y. With this configuration, the two output shafts 110 are differentially connected to the differential gear device 98. The front wheel 15 is connected to the output shaft 110 via a universal joint (not shown) and an axle (not shown).

Next, the oil cooling structure 200 of the motor will be described in detail. As shown in FIG. 5 and FIG. 6, oil grooves extending in the motor axial direction are formed at a plurality of positions corresponding to the teeth 36 placed in the circumferential direction between the casing 21 and the stator core 35. Specifically, at the plurality of positions in the motor circumferential direction of each of the outer circumferential surface of the stator core 35 and the inner side surface of the rear-side casing element 26 opposing the outer circumferential surface of the stator core 35, a plurality of casing oil grooves 142 and a plurality of stator oil grooves 35a are formed as oil grooves. As shown in FIG. 9, the casing oil groove 142 has a cross-sectional shape of an approximate quadrangular shape, elongated in the motor circumferential direction. As shown in FIG. 7B, a cross-sectional shape of the stator oil groove 35a is an approximate triangular shape, and a length of the stator coil groove 35a in the motor circumferential direction is smaller than a length of the casing oil groove 142 (FIG. 9) in the motor circumferential direction.

Further, as shown in FIG. 5 and FIG. 6, on a rear end portion (left end portions of FIG. 5 and FIG. 6) of a core opposing surface 135 having a circular cylindrical shape and which the stator core 35 opposes on the inner side surface of the casing 21, a large-diameter tubular portion 140 having a larger diameter than a front side F of the core opposing surface 135 is formed without machining, simultaneously with pressing during the manufacture of the casing 21. Therefore, a rear end of the large-diameter tubular portion 140 is open. An inner side of the large-diameter tubular portion 140 is in communication with each of the plurality of casing oil grooves 142 and the plurality of stator oil grooves 35a. A rear end portion of the core opposing surface 135 corresponds to an end on a side of a first end in the motor axial direction. The front side F of the core opposing surface 135 corresponds to a side of a second end of the motor axial direction. With this configuration, a first annular space 136 having the entire circumferential direction opened is formed between the large-diameter tubular portion 140 and the rear end outer circumferential surface of the stator core 35. The first annular space 136 is formed such that a rear end side of the stator core 35 in the axial direction is opened. Rear end portions of the plurality of casing oil grooves 142 and the plurality of stator oil grooves 35a are in communication with the first annular space 136.

Figure 13:
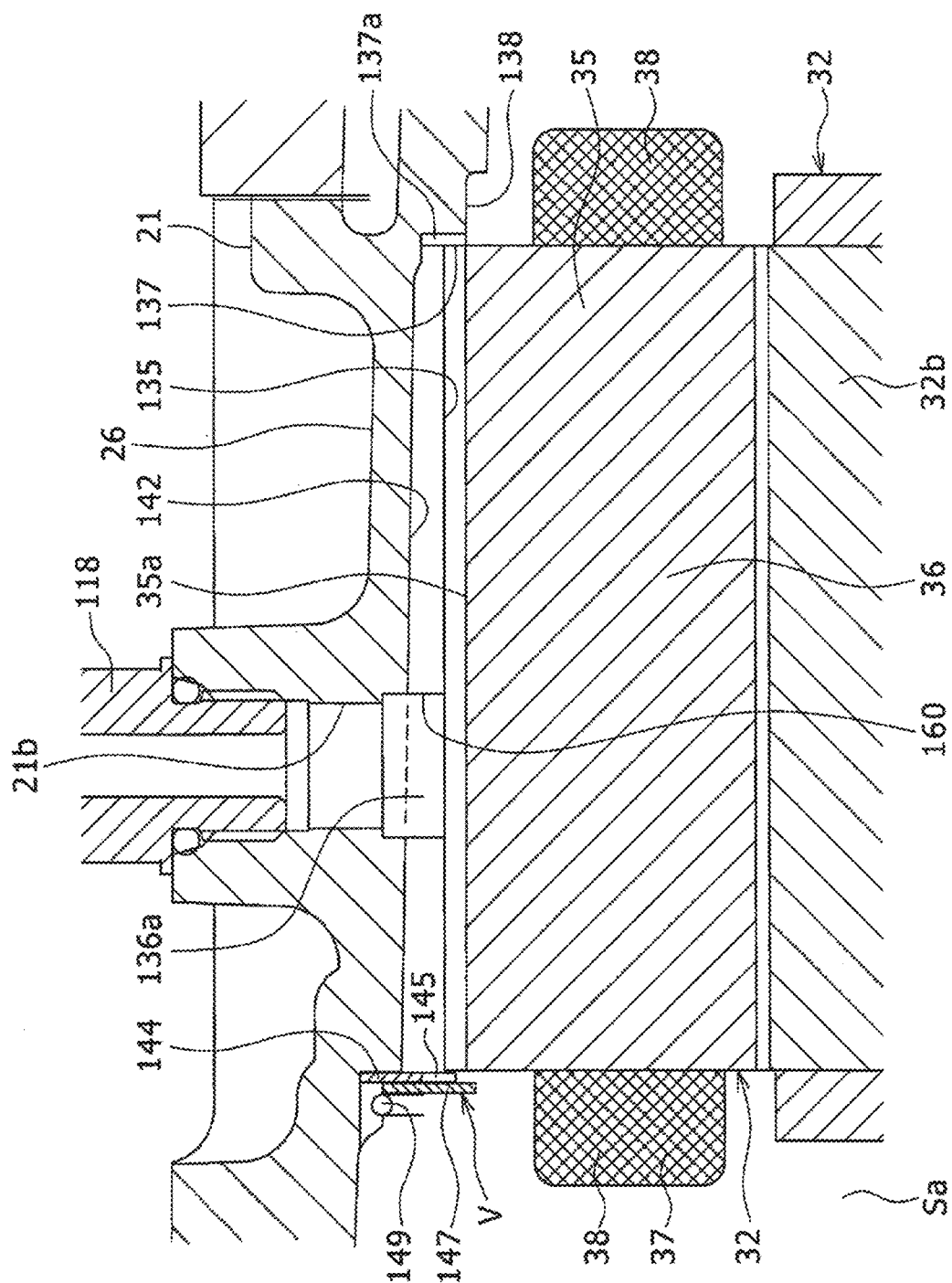
FIG. 13 is a diagram corresponding to FIG. 6, and showing a moving body driving unit according to another embodiment of the present disclosure.

Further, an oil introduction port 21B connecting the inner and outer side surfaces is formed at a position on an upper end portion of the rear-side casing element 26, opposing an intermediate portion of one casing oil groove 142. The oil introduction port 21b is formed on an upper side of the motor storage portion Sa. The oil introduction port 21b introduces oil from the outside into the inside of the casing 21 via the oil introduction joint 118 (FIG. 2) to be described later. For this purpose, the oil introduction port 21b is connected to at least one of the plurality of casing oil grooves 142 and the plurality of stator oil grooves 35a. The oil introduction port 21b is used for supplying oil by dripping or the like to the motor 32 to cool the motor 32. Alternatively, as in a structure of another embodiment shown in FIG. 13, the oil introduction port 21b may be connected to the first annular space 136a at the inner side of the large-diameter tubular portion provided in a ring shape by mechanical machining on an opposing portion of the inner surface of the casing 21 opposing the stator core 35 in a radial direction near the center part in the axial direction of the stator core 35, in place of being connected (directly) to the oil groove. The first annular space 136a is in communication with each of the casing oil grooves 142 and the stator oil grooves 35a. With this configuration, the oil supplied from the oil introduction port 21b to the large-diameter tubular portion 160 spreads over a large number of portions in the circumferential direction at an outer circumferential side near the center part in the axial direction of the stator core 35, and is injected from the outer circumferential side of the ends in the axial direction of the stator core 35 through the casing oil groove 142 or the stator oil groove 35a. In the structure of FIG. 13, the stator oil groove 35a may be omitted, and the outer circumferential surface of the stator core may be set to a simple circular cylindrical surface.

As shown in FIG. 6 and FIG. 9, at the inner side surface of the rear-side casing element 26, at a front side (right side of FIG. 6 and back side of the page of FIG. 9) of the core opposing surface 135, a step surface 137 is formed adjacent to the core opposing surface 135. Adjacent to the step surface 137 and at the front side, a small-diameter tubular portion 138 is formed. The small-diameter tubular portion 138 has a smaller diameter than the core opposing surface 135. An outer circumferential side end portion of an end surface on the front side (right side of FIG. 6) of the stator core 35 is abutted against the step surface 137.

On the step surface 137, at a plurality of positions matching in relation to the plurality of casing oil grooves 142 in the motor circumferential direction, an oil injection groove 137a is formed in a direction from the side of the core opposing surface 135 which is the outer circumferential side to a rotor center O (FIG. 9). As shown in FIG. 9, a cross-sectional shape of the oil injection groove 137a is semi-circular, and a length of the oil injection groove 137a in the motor circumferential direction is smaller than a length of the casing oil groove 142 in the motor circumferential direction. A bottom of the oil injection groove 137a extends from an outer edge of the step surface 137 toward the side of the casing oil groove 142. With this configuration, as shown in FIG. 6, in a state where the outer circumferential side end portion of a front-side end surface of the stator core 35 is abutted against the step surface 137, a space between the casing oil groove 142 and the stator oil groove 35a is in communication with a space inside the small-diameter tubular portion 138 via the inner side of the oil injection groove 137a.

On the other hand, as shown in FIG. 6, at a side opposite (left side of FIG. 6) to the core opposing surface 135 from the rear side end (left side end of FIG. 6) of the stator core 35 on the inner side surface of the rear-side casing element 26, an annular plate V is placed to close the rear end opening of the large-diameter tubular portion 140. The annular plate V is formed from an inner annular plate 144 and an outer annular plate 147. In this state, the circumferential direction of the first annular space 136 is opened over the entire circumference. The inner annular plate 144 is placed adjacent to an opened portion (right end portion of FIG. 6) of the first annular space 136. The outer annular plate 147 is placed in an overlapping manner at a side opposite to the core opposing surface 135 on the inner annular plate 144. The inner annular plate 144 and the outer annular plate 147 has an annular shape. The outer annular plate 147 has an inner diameter smaller than the inner annular plate 144. Outer diameters of the inner annular plate 144 and the outer annular plate 147 are approximately equal to each other in portions other than a protrusion 146 (FIG. 6 and FIG. 7B) to be described later. As shown in FIG. 6 and FIG. 7B, on the inner circumferential surface of the inner annular plate 144, at a position opposing the rear side end (left side end of FIG. 6 and front side end of the page of FIG. 7B) of the stator oil groove 35a, a plurality of oil injection grooves 145 are formed.

Between an outer circumferential surface of the inner annular plate 144 and the inner side surface of the rear-side casing element 26, a recess-projection engagement portion 148 for blocking rotation of the inner annular plate 144 with respect to the casing 21 is provided. The recess-projection engagement portion 148 corresponds to a plate-side recess-projection engagement portion. The recess-projection engagement portion 148 is formed from the protrusion 146 formed to protrude on the outer side in the radial direction on an upper part which is a part of the circumferential direction of the outer circumferential surface of the inner annular plate 144, and a recess 140a formed at a part of the circumferential direction of the large-diameter tubular portion 140 of the inner side surface of the rear-side casing element 26 and with which the projection 146 engages. With this configuration, the rotation of the inner annular plate 144 with respect to the casing 21 is blocked. Because of this, it becomes possible to easily match the positions in relation to the motor circumferential direction of the oil injection groove 145 of the inner annular plate 144 and the stator oil groove 35a formed on the stator core 35, during the manufacture of the moving body driving unit 20. On the other hand, the outer annular plate 147 does not have a protrusion on the outer circumferential surface.

As shown in FIG. 6, a locking ring 149 is locked on a side opposite to the first annular space 136 with respect to the outer annular plate 147 on the inner side surface of the rear-side casing element 26, and the inner annular plate 144 and the outer annular plate 147 are sandwiched by the locking ring 149 and the rear-side end surface (left-side end surface of FIG. 6) of the stator core 35. As described before, the inner diameter of the outer annular plate 147 is smaller than the inner diameter of the inner annular plate 144. Because of this, as shown by an arrow a of FIG. 6, the oil sent from the outside to a region between the casing oil groove 142 and the stator oil groove 35a is sent to ends of the casing oil groove 142 and the stator oil groove 35a, on the side of the first annular space 136 (left-side end of FIG. 6) via the oil introduction port 21b. As shown by an arrow 13 of FIG. 6, a direction of flow of the oil is changed by a second annular space L (FIG. 6) surrounded by the inner circumferential surface of the inner annular plate 144 including the oil injection groove 145 and a side surface of an inner edge portion of the outer annular plate 147, and the oil is injected toward the coil end 38 on the side of the first annular space 136 (left side of FIG. 6).

As will be described later, the oil introduction joint 118 shown in FIG. 2 is connected to the oil introduction port 21b, and the oil is introduced from an external oil path 120 into the casing 21 through the oil introduction joint 118. The oil is injected from one of the plurality of casing oil grooves 142 and from the first annular space 136 and ends of the plurality of casing oil grooves 142 and the plurality of stator oil grooves 35a on the side opposite to the first annular space 136 (right-side end portion of FIG. 6), toward the plurality of coil ends 38 which are ends of the stator coil 37 in the axial direction of the stator 32a. In this process, the oil entering the first annular space 136 enters a region between the plurality of casing oil grooves 142 other than the casing oil groove 142 to which the oil introduction port 21b is connected, and the stator oil grooves 35a opposing these casing oil grooves 142 while the oil flows in the circumferential direction, and the oil flows to the front side (right side of FIG. 6). The oil is injected from ends of the plurality of casing oil grooves 142 and the stator oil grooves 35a on a side opposite to the first annular space 136 toward the coil end 38 at the side opposite to the first annular space 136 (right side of FIG. 6) via the inner side of the oil injection groove 137a. Thus, the oil is injected from the outer circumferential side of the ends in the axial direction of the stator core 35 toward the plurality of coil ends 38 at the ends in the stator axial direction.

Further, as shown in FIG. 2, an oil discharge joint 116 is connected to a lower end on a right surface of a front end portion (right end portion of FIG. 2) of the casing 21. Because of this, as shown in FIG. 11, an oil discharge port 21c is formed, which is in communication with the bottom of the second gear storage portion S2 at the inner side the casing 21. With this configuration, the oil discharge port 21c is formed at a lower side of the second gear storage portion S2. The oil discharge joint 116 has one end 116a inserted into the oil discharge port 21c and another end 116b along an outer side surface of the casing 21. Thus, the oil discharge joint 116 is connected to the oil discharge port 21c. The oil discharge joint 116 corresponds to a pipe joint. The oil introduction joint 118 (FIG. 2) is connected to the oil introduction port 21b (FIG. 5) formed at the upper part of the rear end portion (left end portions of FIG. 2 and FIG. 5) of the casing 21. A pipe which forms the external oil path 120 (FIG. 2) at the outer side of the casing 21 is connected to the oil discharge joint 116 and the oil introduction joint 118. Desirably, a heat discharge fin is provided on the pipe. With this configuration, the external oil path 120 is connected to the oil discharge port 21c and the oil introduction port 21b. In this configuration, the external oil path 120 is connected to the oil discharge port 21c via the other end 116b of the oil discharge joint 116. When a product of the moving body driving unit 20 is transported, an oil sealing member (not shown) is attached respectively in place of the oil introduction joint 118 (FIG. 2) and the oil discharge joint 116 (FIG. 2).

As shown in FIG. 2, the external oil path 120 is connected to the oil introduction port 21b (FIG. 5) and the oil discharge port 21c (FIG. 11) at the outer side of the casing 21, and includes an electric pump (oil pump) 121 and an oil cooler 123. The oil discharged from the oil discharge joint 116 is sucked by the electric pump 121, is cooled by the oil cooler 123, and is then sent to the oil introduction joint 118. The oil sent from the oil introduction joint 118 to the inner side of the casing 21 flows, as shown in FIG. 6, from an upper side of the stator core 35 of the motor 32 to the lower side on the sides in the front-and-rear direction (left-and-right direction of FIG. 6) at the inner side of the motor storage portion Sa. In this process, as described above, the oil is injected from the first annular space 136 and from the ends of the plurality of casing oil grooves 142 and the plurality of stator oil grooves 35a on the side opposite to the first annular space 136 toward the plurality of coil ends 38 on both sides in the axial direction, to cool the plurality of coil ends 38. For example, as described above, the oil is injected from the ends of the stator oil groove 35a and the casing oil groove 142 on the side of the first annular space 136 toward the coil end 38 on the side of the first annular space 136 via the second annular space L at the inner side of the inner annular plate 144. In this process, while the oil flows from the upper side in the first annular space 136 in the circumferential direction, the oil is injected from positions matching the plurality of oil injection grooves 145 (FIG. 7B) with respect to the circumferential direction toward the side of the rotor center O and the coil end 38 on the side of the first annular space 136 (front side of the page of FIG. 7A), as shown by an arrow K in FIG. 7A.

The oil flowing to the lower part of the motor storage portion Sa is sent through the first gear storage portion S1 shown in FIG. 5, to the second gear storage portion S2. The oil is then sent from the second gear storage portion S2 through the oil discharge joint 116 (FIG. 2) and is returned to the external oil path 120. With this process, the oil circulates through the external oil path 120, the motor storage portion Sa, and the first and second gear storage portions S1 and S2, and, with this circulation, the motor 23 shown in FIG. 5 is cooled and the gear mechanism 94 and the differential gear device 98 are lubricated. The positions of the external oil path 120, the electric pump 121, and the oil cooler 123 shown in FIG. 2 are merely shown for conceptual description of the oil circulation circuit, and do not show the actual placement positions. Desirably, the electric pump 121 and the oil cooler 123 are placed inside a hood of the vehicle.

Figure 12:
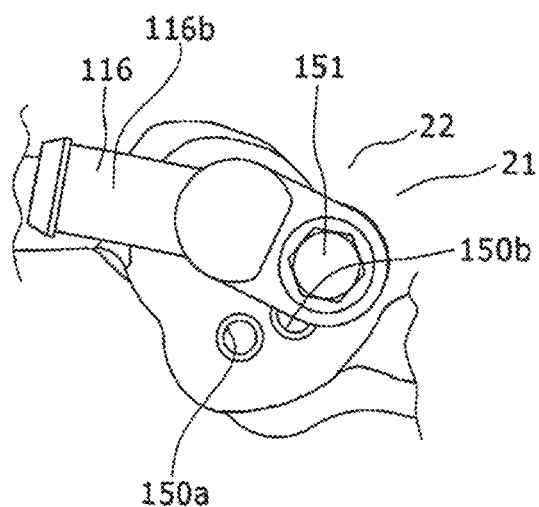
FIG. 12 is a diagram corresponding to an enlargement of a J part of FIG. 2, with an attachment position of a pipe joint changed from FIG. 2.

FIG. 12 is a diagram corresponding to an enlargement of a J part of FIG. 2 when an attachment position of the oil discharge joint 116 is changed from FIG. 2. As shown in FIG. 2 and FIG. 12, at the outer side surface of the casing 21, three screw holes 150a, 150b, and 150c are formed as at least two screw holes at a periphery of the oil discharge port 21c, centered at the oil discharge port 21c (FIG. 11). Three screw holes 150a, 150b, and 150c include a first screw hole 150a at a lowermost end, a second screw hole 150c at an uppermost end, and an intermediate screw hole 150b between the screw holes 150a and 150c. In FIG. 2~FIG. 11, a bolt 151 serving as a screw which is screw-combined to the first screw hole 150a is used to combine the oil discharge joint 116 with the casing 21.

As shown in FIG. 12, the oil discharge joint 116 is formed to be combinable with the casing 21 with a direction of the other end 116b changeable, using the second screw hole 150c (FIG. 2), in place of the first screw hole 150a. The oil discharge joint 116 is formed to be combinable also using the intermediate screw hole 150b in place of the first screw hole 150a. With this configuration, the direction of the oil discharge joint 116 can be easily changed and a large number of components of the moving body driving unit 20 can be shared, according to a layout of the external oil path 120 which is bent in order to avoid interference with the inner structure of the vehicle. The number of the screw holes 150a, 150b, and 150c formed at the periphery of the oil discharge port 21c is not limited to three, and may alternatively be two, including only the first screw hole and the second screw hole, or four or more.

Further, the moving body driving unit 20 has a first magnet 153 (FIG. 5) and a filter 154 (FIG. 11) as purification means provided at least in the second gear storage portion S2 and for purifying the oil sucked to the oil discharge port 21c. As shown in FIG. 5, a drain plug 152 is screw-combined on a bottom of the casing 21 at the front side to pass through the bottom from the outside, and the first magnet 153 is attached on a tip of the drain plug 152 and placed in the second gear storage portion S2. The first magnet 153 attracts with a magnetic force foreign objects such as iron powder or the like in the oil in the second gear storage portion S2, generated by wear of the gear of the differential gear device 98 or the like, to purify the oil before sucking by the electric pump 121 (FIG. 2) toward the oil discharge port 21c (FIG. 11).

As shown in FIG. 11, the filter 154 is connected, in the oil discharge port 21c, to be placed at the inner side of the casing 21 which is the opposite side of the oil discharge joint 116. In the filter 154, a filter body having a mesh cage form is connected to a flange, and the flange is fixed on the oil discharge port 21c. With this configuration, when the oil in the second gear storage portion S2 includes a foreign object, the foreign object is captured, or discharge of the foreign object to the external oil path 120 (FIG. 2) is blocked, to purify the oil sucked toward the oil discharge port 21c. As described above, the oil can be purified by the first magnet 153 and the filter 154, and therefore, attachment of a large amount of foreign objects to the rotor 32b (FIG. 5) of the motor 32 can be prevented, generation of rotational resistance in the motor 32 due to the foreign objects can be prevented, and consequently, a state of high transmitting efficiency can be maintained. In addition, it becomes unnecessary to provide a filter in the external oil path 120.

Further, as shown in FIG. 3, at a lower end portion of the partitioning wall 26a of the casing 21, a through hole 26b for connecting the motor storage portion Sa and the first gear storage portion S1 is formed. The moving body driving unit 20 has a second magnet 155 having a circular disk shape which is fitted and fixed on the through hole 26b. An inner circumferential surface of the through hole 26b holds an outer circumferential surface of the second magnet 155 so that respective side surfaces of the second magnet 155 are exposed respectively to the motor storage portion Sa and the first gear storage portion S1, and falling of the second magnet 155 in the axial line direction is prevented. With this configuration, the second magnet 155 attracts, by magnetic force, foreign objects such as iron powder included in the oil in the motor storage portion Sa and the first gear storage portion S1, to purify the oil sucked toward the oil discharge port 21c (FIG. 11). Because of this structure, the foreign objects such as the iron powder included in the oil both in the motor storage portion Sa and the first gear storage portion S1 can be efficiently removed by one second magnet 155.

According to the moving body driving unit 20 described above, the oil which has cooled the motor 32 in the motor storage portion Sa flows through the oil passage 130 from the motor storage portion Sa to the second gear storage portion S2. In this manner, the gears of the differential gear device 98 in the second gear storage portion S2 can be lubricated by the oil for oil-cooling the motor 32. In addition, the oil which has cooled the motor 32 in the motor storage portion Sa flows to the second gear storage portion S2 through the oil passage 130 which is formed at an outer side in the radial direction of the motor storage portion Sa and which has a lower end at a lower side than the rotor 32b. With this configuration, the oil surface T of the oil accumulated in the motor storage portion Sa can be easily set lower than the lower end of the rotor 32b. Thus, contact of the oil accumulated in the motor storage portion Sa with the rotor 32b can be suppressed, and output loss in the oil cooling of the motor 32 can be suppressed. In addition, because the oil passage 130 is formed in the casing 21, it is not necessary to connect a pipe for connecting the motor storage portion Sa and the second gear storage portion S2 in place of the oil passage 130 at the outer side of the casing 21. With this configuration, increases in the size and the number of components of the moving body driving unit 20 can be suppressed.

Moreover, after the assembly of the moving body driving unit 20, it is not necessary to separately supply the oil for gear lubrication and the oil for motor cooling to the inside of the casing 21, and therefore, a supply operation of the oil can be simplified.

Further, according to the oil cooling structure 200 of the motor described above, the oil is injected from the first annular space 136 in the casing 21 and from the ends of the plurality of casing oil grooves 142 and the stator oil grooves 35a at the side opposite to the first annular space 136, toward the plurality of coil ends 38 on both sides in the motor axial direction. With this configuration, oil can be injected toward the coil end 38 from a large number of portions in the circumferential direction, namely, the first annular space 136, and the ends of the plurality of casing oil grooves 142 and the stator oil grooves 35a in communication with the first annular space, on the side opposite to the first annular space 136. Because of this, the surface which contacts the oil in the circumferential direction of the motor 32 can be increased, and the cooling characteristic of the motor 32 can be efficiently improved.

In the above description, a case is described in which the oil introduction port 21b is connected to one casing oil groove 142 and one stator oil groove 35a. Alternatively, the oil introduction port may be connected to a plurality of casing oil grooves and a plurality of stator oil grooves.

In addition, in the above description, the inner annular plate 144 and the outer annular plate 147 are used for injecting the oil to the motor 32 on the side of the first annular space 136, but alternatively, only one annular plate may be used. In this case, the annular plate may have a similar shape to the inner annular plate 144 shown in FIG. 6. The annular plate is placed at a portion of the inner side surface of the casing 21 which opposes the end of the stator core 35 on the side of the first annular space 136 in the axial direction of the stator core 35, or at a side that is further out than the end of the stator core 35 on the side of the first annular space 136. The oil is injected from the first annular space 136 via a gap between an inner circumferential surface of the annular plate and an outer circumferential surface of the stator core 35 toward the coil end on the side of the first annular space 136. In this case, the annular plate may be placed at a portion of the inner side surface of the casing 21 which opposes the end of the stator core 35 on the side of the first annular space 136, and oil injection grooves may be formed similar to the inner annular plate 144 of FIG. 6 at a plurality of positions on the inner circumferential surface of the annular plate. The annular plate is fixed to the casing 21, for example, by pressing the annular plate to the stator core 35 in the axial direction by the locking ring 149 shown in FIG. 6. In this case, similar to the recess-projection engagement portion 148 shown in FIG. 6, a plate-side recess-projection engagement portion for blocking the rotation of the annular plate with respect to the casing 21 may be provided between the inner side surface of the casing 21 and the outer circumferential surface of the annular plate. In this manner, with the use of only one annular plate for injecting the oil to the motor 32 on the side of the first annular space 136, it becomes possible, to reduce the number of components.

Alternatively, in the case where only one annular plate is used for injecting the oil to the motor 32 on the side of the first annular space 136, a structure may be employed in which, similar to the outer annular plate 147 shown in FIG. 6, the annular plate is placed at a side that is further out than the end of the stator core 35 on the side of the first annular space on the inner side surface of the casing 21. In this case, the annular plate may have a circular disk shape in which the inner circumferential surface and the outer circumferential surface thereof respectively have a circular shape. The oil is injected from the first annular space 136 via a gap between the inner circumferential surface of the annular plate and the outer circumferential surface of the stator core 35 toward the coil end on the side of the first annular space 136. According to this structure, the shape of the annular plate can be simplified, and the manufacturing cost can consequently be reduced.

Alternatively, in the structure shown in FIG. 1~FIG. 11, a configuration may be employed in which the casing oil groove 142 is formed on the casing 21, but the stator oil groove is not formed on the stator core. In this case, the stator core is fixed with respect to the casing 21 by shrink fitting or press fitting. The outer circumferential surface of the stator core is formed in a simple circular cylindrical surface having no groove extending in the axial direction. According to this structure, it becomes unnecessary to match the positions in the motor circumferential direction of the stator oil groove and the casing oil groove 142, and thus, it becomes unnecessary to provide the core-side recess-projection engagement portion for blocking the rotation of the stator core between the stator core and the casing 21. Thus, the shape of the stator core can be simplified, and the manufacturing cost can consequently be reduced.

The moving body driving unit of the embodiment(s) described above has a moving body driving unit according to a structure of the present disclosure. Because of this, the oil which has cooled the electric motor in the motor storage portion flows from the motor storage portion to the gear storage portion via the oil passage. With this configuration, the gear device in the gear storage portion can be lubricated by the oil for oil-cooling of the electric motor. Further, because the oil passage is formed in the casing, it is unnecessary to connect a pipe for connecting the motor storage portion and the gear storage portion at the outer side of the casing, in place of the oil passage in the casing. Thus, the increases in the size and the number of components of the moving body driving unit can be suppressed.

Further, at least one of the embodiment(s) described above discloses an oil cooling structure of a motor for an electricity-driven vehicle, having a first configuration. The oil cooling structure of the first configuration comprises: a casing; and a motor having a stator having a stator core which is fitted to an inner side of the casing and which has a tubular shape, and in which a coil is would around an inner circumferential side of a plurality of positions in a circumferential direction, and a rotor which is placed at an inner side of the stator, wherein oil grooves which extend in an axial direction are formed at a plurality of positions in a circumferential direction between the casing and the stator core, a first annular space is formed on an inner side surface of the casing in which a tubular portion having an inner side in communication with each of the oil grooves is formed and which has a circumferential direction opened between the tubular portion and an outer circumferential surface of a part of the stator core in an axial direction, the casing includes an oil introduction port which is connected to at least one of the plurality of oil grooves or to the first annular space and which introduces oil from outside, and oil is injected from an outer circumferential side of respective ends of the stator core in the axial direction toward a plurality of coil ends which are respective ends of the coil in the axial direction of the stator.

The oil cooling structure of the first configuration solves the following problem. As a structure of the related art, a structure may be employed in which a motor for an electricity-driven vehicle is placed in a casing of a transmission, oil is injected to the motor from an oil tube attached at an upper side of the motor in the casing, and the motor is oil-cooled. However, in this structure, it is difficult to cause the oil to contact a large number of portions in the circumferential direction of the motor, and there is room for improvement from the viewpoint of improving the cooling characteristic of the motor. For example, at the lower portion of the motor in the circumferential direction, the oil is isolated from and falls off the motor, and thus, it is not possible to increase the surfaces with which the oil contacts in relation to the circumferential direction of the motor, and there is room for improvement for efficiently cooling the motor. An advantage of the oil cooling structure of the first configuration lies in improvement of the cooling characteristic of the motor in the oil cooling structure of the motor for the electricity-driven vehicle.

According to the oil cooling structure of the first configuration, the oil introduced from the oil introduction port is supplied to a large number of portions in the circumferential direction in the first annular space in the casing, and the oil can be injected from a large number of portions in the circumferential direction toward the plurality of coil ends which are respective ends of the coil in the axial direction of the stator. Because of this, the surface which the oil contacts can be increased for the circumferential direction of the motor, and the cooling characteristic of the motor can be improved.

At least one of the embodiment(s) described above discloses an oil cooling structure of a motor for an electricity-driven vehicle, having a second configuration. In the oil cooling structure of the second configuration, in addition to the structure of the first configuration, a plurality of casing oil grooves and a plurality of stator oil grooves are formed as the oil grooves at a plurality of positions in a circumferential direction on the outer circumferential surface of the stator and on an inner side surface of the casing opposing the outer circumferential surface of the stator, and the oil is injected from an outer circumferential side of ends of the stator core in an axial direction toward the plurality of coil ends.

At least one of the embodiment(s) described above discloses an oil cooling structure of a motor for an electricity-driven vehicle, having a third configuration. In the oil cooling structure of the motor for the electricity-driven vehicle of the third configuration, in addition to the first configuration or the second configuration, a second end surface of the stator core in the axial direction is abutted against a step surface formed on the inner side surface of the casing, a groove is formed on the step surface on the casing in a direction from an outer circumferential side toward a center of the rotor, and the oil is injected from the outer circumferential side of a first end of the stator core in the axial direction via an inner side of the groove toward the coil end on the side of a second end of the stator core in the axial direction.

At least one of the embodiment(s) described above discloses an oil cooling structure of a motor for an electricity-driven vehicle, having a fourth configuration. In the oil cooling structure of the motor for the electricity-driven vehicle of the fourth configuration, in addition to one of the first configuration through the third configuration, the first annular space is formed such that a side of a first end surface of the stator core in the axial direction is opened, the oil cooling structure comprises an annular plate placed adjacent to an opened portion of the first annular space on the inner side surface of the casing, and the oil is injected from the first annular space via a gap between an inner circumferential surface of the annular plate and an outer circumferential surface of the stator core to the coil end on the side of the first annular space.

At least one of the embodiment(s) described above discloses an oil cooling structure of a motor for an electricity-driven vehicle, having a fifth configuration. In the oil cooling structure of the motor for the electricity-driven vehicle of the fifth configuration, in addition to the fourth configuration, the annular plate includes an inner annular plate placed adjacent to the opened portion of the first annular space, and an outer annular plate placed in an overlapping manner on a side of the inner annular plate opposite to the stator core, and which has a smaller inner diameter than the inner annular plate, and the oil is injected from the first annular space via a second annular space formed by an inner circumferential surface of the inner annular plate and a side surface of an inner circumferential edge of the outer annular plate toward the coil end on the side of the first annular space.

At least one of the embodiment(s) described above discloses an oil cooling structure of a motor for an electricity-driven vehicle, having a sixth configuration. In the oil cooling structure of the motor for the electricity-driven vehicle of the sixth configuration, in addition to the fifth configuration, oil injection grooves are formed at a plurality of positions on the inner circumferential surface of the inner annular plate.

At least one of the embodiment(s) described above discloses an oil cooling structure of a motor for an electricity-driven vehicle, having a seventh configuration. In the oil cooling structure of the motor for the electricity-driven vehicle of the seventh configuration, in addition to the fourth configuration, the oil cooling structure comprises a plate-side recess-projection engagement portion provided between the inner side surface of the casing and the outer circumferential surface of the annular plat, and which blocks rotation of the annular plate with respect to the casing.

At least one of the embodiment(s) described above discloses an oil cooling structure of a motor for an electricity-driven vehicle, having an eighth configuration. In the oil cooling structure of the motor for the electricity-driven vehicle of the eighth configuration, in addition to the fourth configuration, the annular plate has a circular disk shape with both an inner circumferential surface and an outer circumferential surface having a circular shape.

At least one of the embodiment(s) described above discloses an oil cooling structure of a motor for an electricity-driven vehicle, having a ninth configuration. In the oil cooling structure of the motor for the electricity-driven vehicle of the ninth configuration, in addition to any of the first configuration through the eighth configuration, the oil cooling structure comprises a core-side recess-projection engagement portion provided between the inner side surface of the casing and the outer circumferential surface the stator core, and which blocks rotation of the stator core with respect to the casing.

At least one of the embodiment(s) described above discloses an oil cooling structure of a motor for an electricity-driven vehicle, having a tenth configuration. In the oil cooling structure of the motor for the electricity-driven vehicle of the tenth configuration, in addition to the first configuration, the stator core is fixed with respect to the casing by shrink fitting or press fitting, a casing oil groove is provided as the oil groove on the casing, and an outer circumferential surface of the stator core is a simple circular cylindrical surface having no groove which extends in an axial direction.

The invention claimed is:

1. A moving body driving unit used for driving a wheel of a moving body, comprising:
   a casing;
   an electric motor that is placed in a motor storage portion formed at an inner side of the casing on one side in a first direction which is predetermined, and that has a motor shaft which extends in the first direction;
   a gear device that is placed in a gear storage portion which is formed at the inner side of the casing on the other side in the first direction and which also functions as an oil reservoir, and that cooperates with the wheel;
   a motive power transmitting mechanism that is placed in the inner side of the casing and that transmits motive power between the motor shaft and the gear device;
   an oil passage that interconnects the motor storage portion and the gear storage portion at the inner side of the casing;
   an oil introduction port that is formed on an outer surface of the casing at an upper side of the motor storage portion and through which oil is supplied to the electric motor for cooling the electric motor;
   an oil discharge port that is formed on an outer surface of the casing at a lower side of the gear storage portion; and
   an external oil path that is disposed in a space outside the casing and is connected, from outside the casing, to the oil introduction port and the oil discharge port and that has an oil pump, wherein
   the oil passage has a pass-through portion being configured to extend between an outer side surface of the casing and a wall portion of the casing, the wall portion opposing a radially outer side of the electric motor and extending along the first direction and being juxtaposed to the motor storage portion on a radial outer side thereof, the pass-through portion having one end, which is open to the motor storage portion, and being in communication with the gear storage portion, and
   a lower end of the pass-through portion is lower than a lowermost end of a rotor of the electric motor.

2. The moving body driving unit according to claim 1, wherein
   the gear device is a differential gear device which outputs motive power from two output shafts, which are placed in a branched manner on both sides in a second direction orthogonal to the first direction and which extend in the second direction, to the wheel.

3. The moving body driving unit according to claim 1, wherein
   the oil passage is formed at an outer side in a radial direction of the motor storage portion at the inner side of the casing, and has an opening end to the motor storage portion provided at a side that is lower down than a rotor of the electric motor.

4. The moving body driving unit according to claim 1, wherein
   at least two screw holes are formed on an outer side surface of the casing, at a periphery of the oil discharge port, centered around the oil discharge port,
   the moving body driving unit further comprises a pipe joint which is combined with the casing using a screw screw-combined to a first screw hole of the two screw holes, and which has one end which is inserted into the oil discharge port and another end along the outer side surface of the casing,
   the pipe joint is formed to be combinable with the casing with a direction of the other end changeable using a second screw hole of the two screw holes in place of the first screw hole such that the screw is removed from the first screw hole and inserted into the second screw hole so as to be screw-combined to the second screw hole, and
   the external oil path is connected to the oil discharge port through the other end of the pipe joint.

5. The moving body driving unit according to claim 1, wherein
   the oil passage has an intermediate gear storage portion in which an intermediate gear which is a part of the motive power transmitting mechanism is placed,
   the casing includes a partitioning wall which partitions the intermediate gear storage portion and the motor storage portion,
   the oil passage passes through the partitioning wall, and
   a means that purifies oil sucked toward the oil discharge port is provided at least in the gear storage portion.

6. The moving body driving unit according to claim 5, wherein
   a through hole is formed on the partitioning wall,
   the moving body driving unit further comprises a magnet which is fitted to the through hole, and
   respective side surfaces of the magnet are exposed respectively to the motor storage portion and the intermediate gear storage portion.

7. A moving body driving unit used for driving a wheel of a moving body, comprising:
   a casing;
   an electric motor that is placed in a motor storage portion formed at an inner side of the casing on one side in a first direction which is predetermined, and that has a motor shaft which extends in the first direction;
   a gear device that is placed in a gear storage portion which is formed at the inner side of the casing on the other side in the first direction and which also functions as an oil reservoir, and that cooperates with the wheel;
a motive power transmitting mechanism that is placed in the inner side of the casing and that transmits motive power between the motor shaft and the gear device;
an oil passage that interconnects the motor storage portion and the gear storage portion at the inner side of the casing;
an oil introduction port that is formed on an outer surface of the casing at an upper side of the motor storage portion and through which oil is supplied to the electric motor for cooling the electric motor;
an oil discharge port that is formed on an outer surface of the casing at a lower side of the gear storage portion; and
an external oil path that is disposed in a space outside the casing and is connected, from outside the casing, to the oil introduction port and the oil discharge port and that has an oil pump, wherein
the electric motor includes a stator having a stator core which is fitted to the inner side of the casing, and which has a tubular shape, and in which a coil is wound on an inner circumferential side of a plurality of positions in a circumferential direction, and a rotor placed at an inner side of the stator,
oil grooves extending in an axial direction are formed between the casing and the stator core, at a plurality of positions in a circumferential direction,
a tubular surface portion is formed on an inner side of the casing in which an inner surface of the casing is concaved radially outwardly, the tubular surface portion has an inner side in communication with each of the oil grooves, the tubular surface portion is located radially outward from a most radially outward edge of the oil grooves, and a first annular space is opened in the circumferential direction between the tubular surface portion and an outer circumferential surface of a part of the stator core in the axial direction,
the oil introduction port is provided in the casing, is connected to at least one of the plurality of oil grooves or to the first annular space, and introduces oil from outside,
the first annular space is formed only in a region opposed to one side of the stator core in the axial direction, and
oil is injected from an outer circumferential side of respective ends of the stator core in the axial direction to a plurality of coil ends which are respective ends of the coil in the axial direction of the stator.

8. The moving body driving unit according to claim 7, wherein
a plurality of casing oil grooves and a plurality of stator oil grooves are formed as the oil grooves at a plurality of positions in the circumferential direction on the outer circumferential surface of the stator and on the inner side surface of the casing which opposes the outer circumferential surface of the stator, and
the oil is injected from the outer circumferential side of the respective ends of the stator core in the axial direction toward the plurality of coil ends.

9. The moving body driving unit according to claim 7, wherein
a second end surface of the stator core in the axial direction is abutted against a step surface formed on the inner side surface of the casing, the second end surface being an end surface of the other side of the stator core in the axial direction,
a groove is formed on the step surface in the casing, in a direction from the outer circumferential side toward a center of the rotor, and
the oil is injected from the outer circumferential side of a first end of the stator core in the axial direction via an inner side of the groove toward the coil end at the side of a second end of the stator core in the axial direction, wherein the first end of the stator core is an end of the one side of the stator core in the axial direction, while the second end of the stator core is an end of the other side of the stator core in the axial direction.

10. The moving body driving unit according to claim 7, further comprising:
a core-side recess-projection engagement portion provided between the inner side surface of the casing and the outer circumferential surface of the stator core, and which blocks rotation of the stator core with respect to the casing.

11. The moving body driving unit according to claim 7, wherein
the stator core is fixed with respect to the casing by shrink fitting or press fitting,
a casing oil groove is provided as the oil groove on the casing, and
the outer circumferential surface of the stator core is a simple circular cylindrical surface with no groove extending in an axial direction.

12. A moving body driving unit used for driving a wheel of a moving body, comprising:
a casing;
an electric motor that is placed in a motor storage portion formed at an inner side of the casing on one side in a first direction which is predetermined, and that has a motor shaft which extends in the first direction;
a gear device that is placed in a gear storage portion which is formed at the inner side of the casing on the other side in the first direction and which also functions as an oil reservoir, and that cooperates with the wheel;
a motive power transmitting mechanism that is placed in the inner side of the casing and that transmits motive power between the motor shaft and the gear device;
an oil passage that interconnects the motor storage portion and the gear storage portion at the inner side of the casing;
an oil introduction port that is formed on an outer surface of the casing at an upper side of the motor storage portion and through which oil is supplied to the electric motor for cooling the electric motor;
an oil discharge port that is formed on an outer surface of the casing at a lower side of the gear storage portion; and
an external oil path that is disposed in a space outside the casing so as to be connected, from outside the casing, to the oil introduction port and the oil discharge port and that has an oil pump, wherein
the electric motor includes a stator having a stator core which is fitted to the inner side of the casing, and which has a tubular shape, and in which a coil is wound on an inner circumferential side of a plurality of positions in a circumferential direction, and a rotor placed at an inner side of the stator,
oil grooves extending in an axial direction are formed between the casing and the stator core, at a plurality of positions in a circumferential direction,
a first annular space is formed on an inner side of the casing in which a tubular portion having an inner side in communication with each of the oil grooves is formed on an inner side surface of the casing, and which is opened in the circumferential direction between the tubular portion and an outer circumferential surface of a part of the stator core in the axial direction, the oil introduction port is provided in the casing, is connected to at least one of the plurality of oil grooves or to the first annular space, and introduces oil from outside, oil is injected from an outer circumferential side of respective ends of the stator core in the axial direction to a plurality of coil ends which are respective ends of the coil in the axial direction of the stator, the first annular space is formed such that a side of a first end surface of the stator core in the axial direction is opened, the moving body driving unit further comprises an annular plate placed adjacent to an opened portion of the first annular space on the inner side surface of the casing, and the oil is injected from the first annular space via a gap between an inner circumferential surface of the annular plate and the outer circumferential surface of the stator core toward the coil end on the side of the first annular space.

13. The moving body driving unit according to claim 12, wherein the annular plate includes an inner annular plate placed adjacent to the opened portion of the first annular space, and an outer annular plate placed in an overlapping manner on a side opposite to the stator core in the inner annular plate and which has a smaller inner diameter than the inner annular plate, and the oil is injected from the first annular space via a second annular space formed by an inner circumferential surface of the inner annular plate and a side surface of an inner circumferential edge of the outer annular plate, toward the coil end on the side of the first annular space.

14. The moving body driving unit according to claim 13, wherein oil injection grooves are formed at a plurality of positions on the inner circumferential surface of the inner annular plate.

15. The moving body driving unit according to claim 12, further comprising:

a plate-side recess-projection engagement portion provided between the inner side surface of the casing and an outer circumferential surface of the annular plate, and which blocks rotation of the annular plate with respect to the casing.

16. The moving body driving unit according to claim 12, wherein the annular plate has a circular disk shape with the inner circumferential surface and the outer circumferential surface respectively having a circular shape.

* * * * *